(12) United States Patent
Kaneda

(10) Patent No.: US 9,363,394 B2
(45) Date of Patent: Jun. 7, 2016

(54) INFORMATION PROCESSING APPARATUS CAPABLE OF SETTING INSERT, IMAGE FORMING APPARATUS, METHOD OF CONTROLLING THE INFORMATION PROCESSING APPARATUS, AND STORAGE MEDIUM

(71) Applicant: CANON KABUSHIKI KAISHA, Tokyo (JP)

(72) Inventor: Kanako Kaneda, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/466,438

(22) Filed: Aug. 22, 2014

(65) Prior Publication Data

US 2014/0362410 A1 Dec. 11, 2014

Related U.S. Application Data

(63) Continuation of application No. 14/098,174, filed on Dec. 5, 2013, now Pat. No. 8,848,205.

(30) Foreign Application Priority Data

Dec. 5, 2012 (JP) .................................. 2012-266227

(51) Int. Cl.
| | | |
|---|---|---|
| *G06F 3/12* | (2006.01) | |
| *H04N 1/00* | (2006.01) | |
| *G06F 15/00* | (2006.01) | |

(52) U.S. Cl.
CPC ....... *H04N 1/00448* (2013.01); *H04N 1/00129* (2013.01); *H04N 1/00392* (2013.01); *H04N1/00411* (2013.01); *H04N 1/00458* (2013.01); *H04N 1/00461* (2013.01); *H04N 1/00466* (2013.01); *H04N 1/00663* (2013.01); *H04N 1/00413* (2013.01); *H04N 2201/0075* (2013.01); *H04N 2201/0094* (2013.01)

(58) Field of Classification Search
CPC .......... H04N 1/00384; H04N 1/00411; H04N 1/00413; G03G 15/502; G03G 3/1205; G03G 3/1256
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| | | | |
|---|---|---|---|
| 8,788,936 | B2 | 7/2014 | Kobashi |
| 2006/0262347 | A1 | 11/2006 | Ono |
| 2007/0177207 | A1 | 8/2007 | Ahmad |
| 2008/0291474 | A1* | 11/2008 | Hoshino ........................ 358/1.9 |

FOREIGN PATENT DOCUMENTS

| | | |
|---|---|---|
| CN | 1866198 A | 11/2006 |
| CN | 101051257 A | 10/2007 |
| JP | 2004-282439 A | 10/2004 |

OTHER PUBLICATIONS

Chinese Office Action issued in counterpart application No. CN201310652623.2, dated Dec. 30, 2015. English translation provided.

* cited by examiner

*Primary Examiner* — Thierry L Pham
(74) *Attorney, Agent, or Firm* — Rossi, Kimms & McDowell LLP

(57) ABSTRACT

An information processing apparatus capable of realizing setting of an insert including an interleaf sheet and a chapter sheet, on an image forming apparatus, by an intuitive operation similar to an actual insertion operation. An operation terminal includes a touch screen display and a network communication section which communicates with an MFP, and is capable of performing an operation on the MFP concerning document printing, and setting an insert to a printed matter to be printed by the MFP. When a user's drag operation causes insertion of an insert image displayed on the touch screen display between adjacent preview images of pages of the printed matter displayed on the same, the insert image is set as an interleaf sheet, and when the operation causes superimposing of the insert image on a preview image, the insert image is set as a chapter sheet.

10 Claims, 27 Drawing Sheets

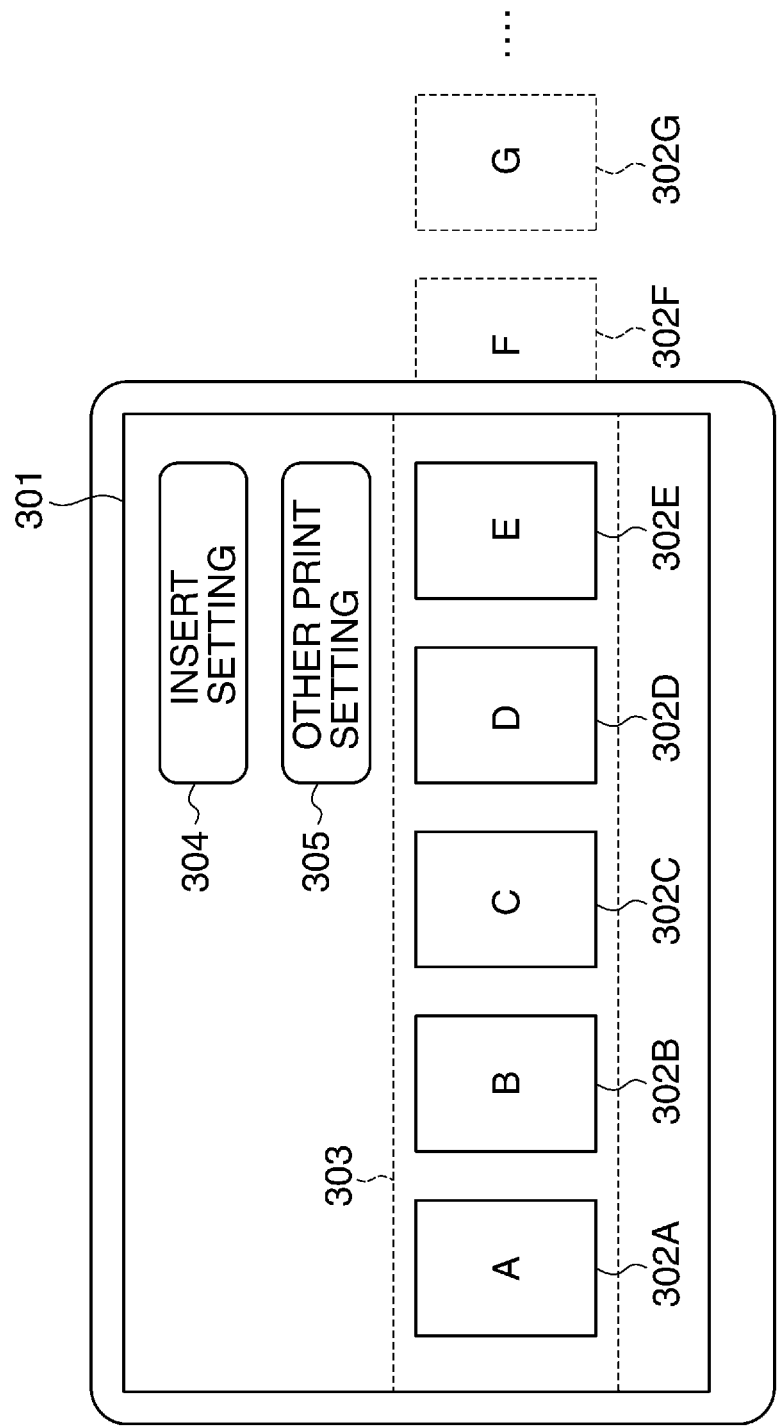

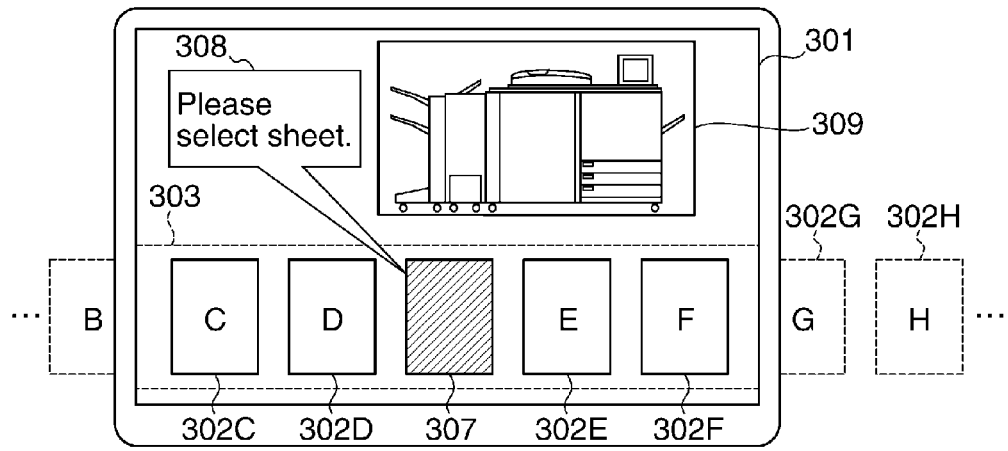
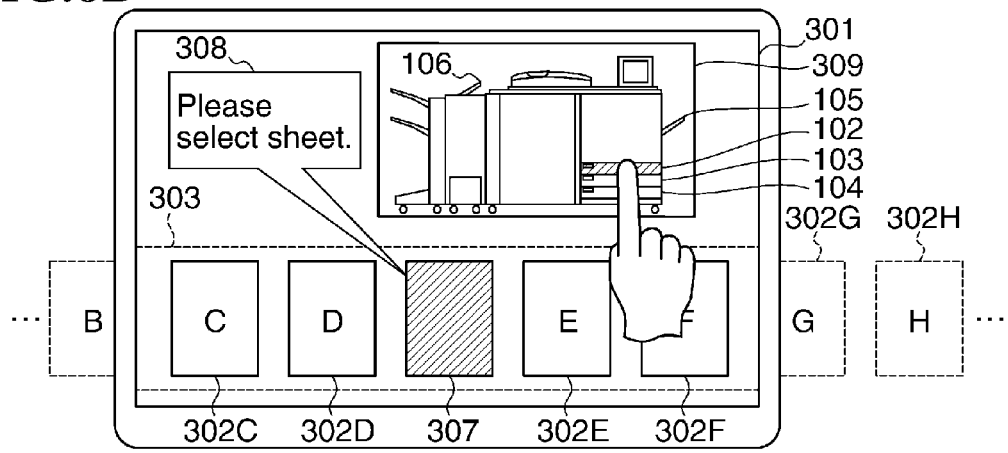
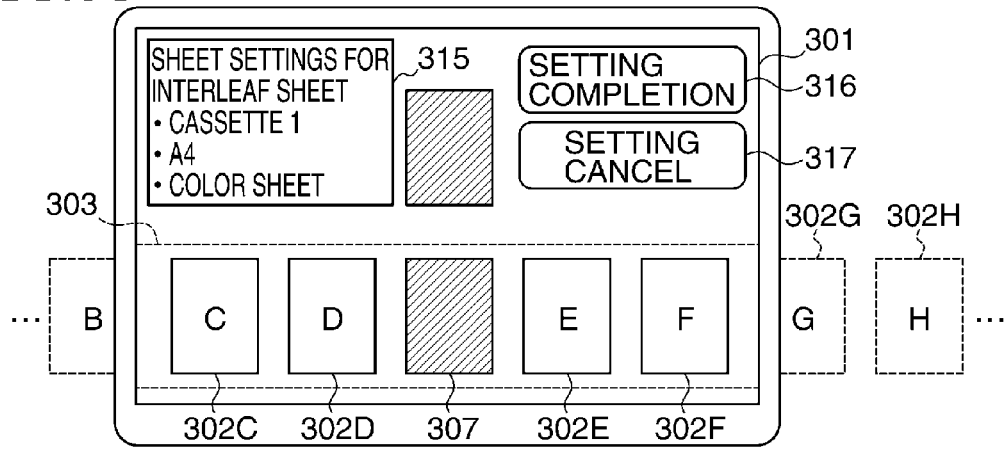

FIG.11
| SHEET REGISTRATION INFORMATION | |
|---|---|
| SHEET CASSETTE 1 | COLOR SHEET A |
| SHEET CASSETTE 2 | COLOR SHEET B |
| SHEET CASSETTE 3 | COLOR SHEET C |
| MANUAL FEED TRAY | TAB SHEET |
| INSERTER | NONE |
602
FIG.12A
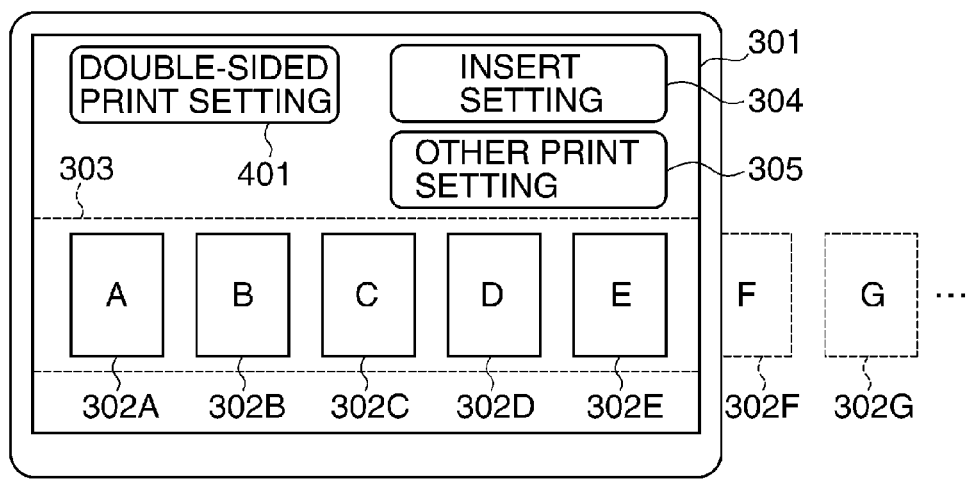
FIG.12B
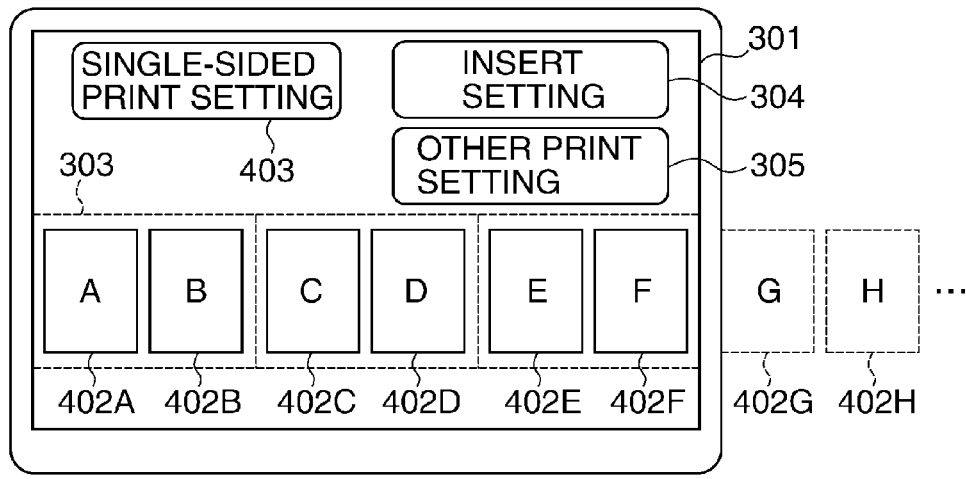

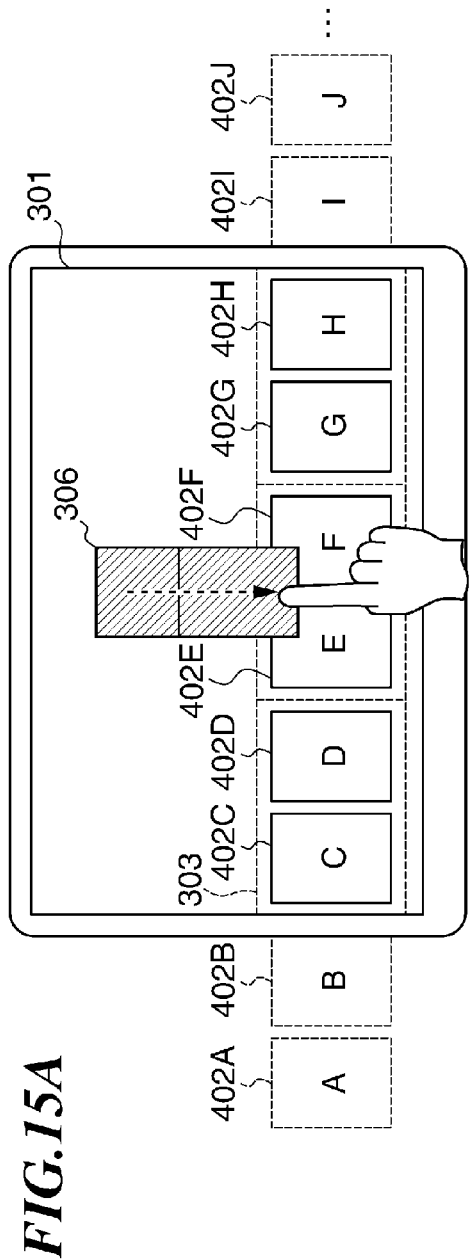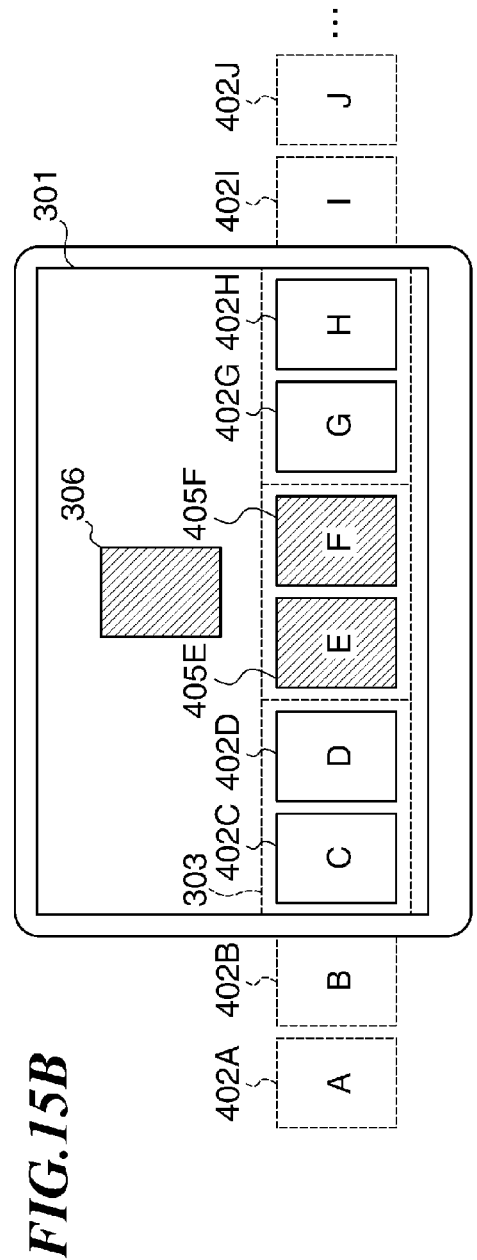

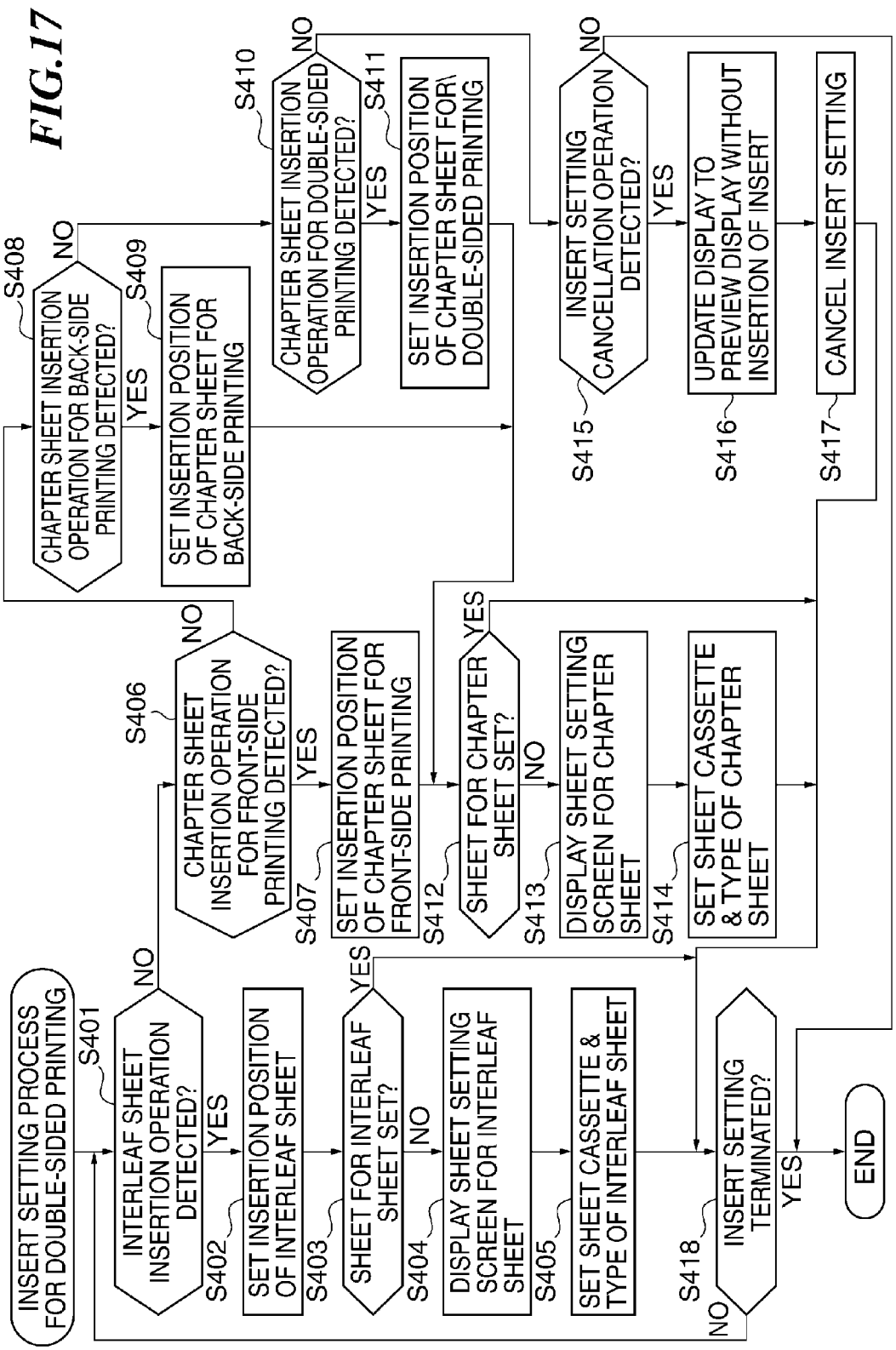

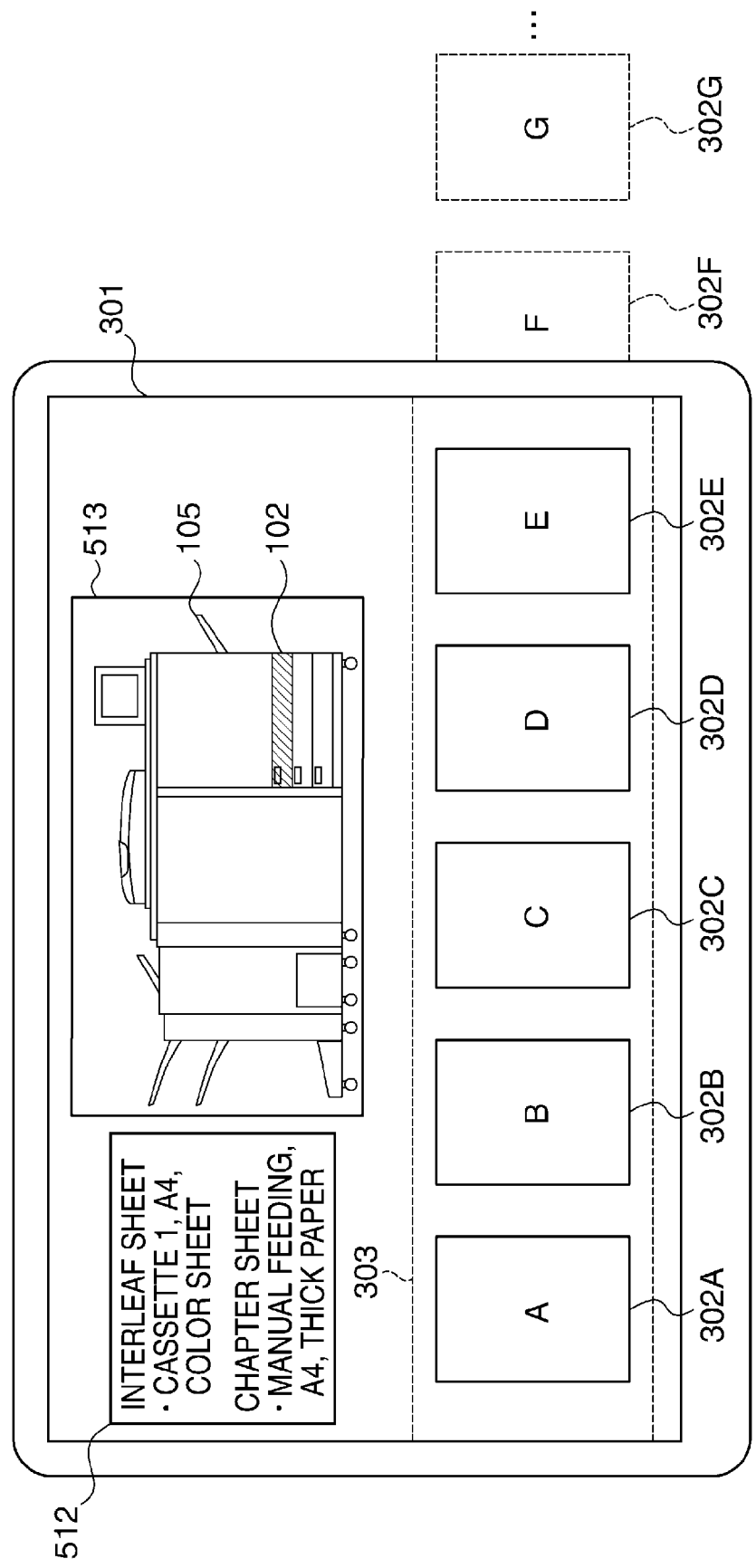

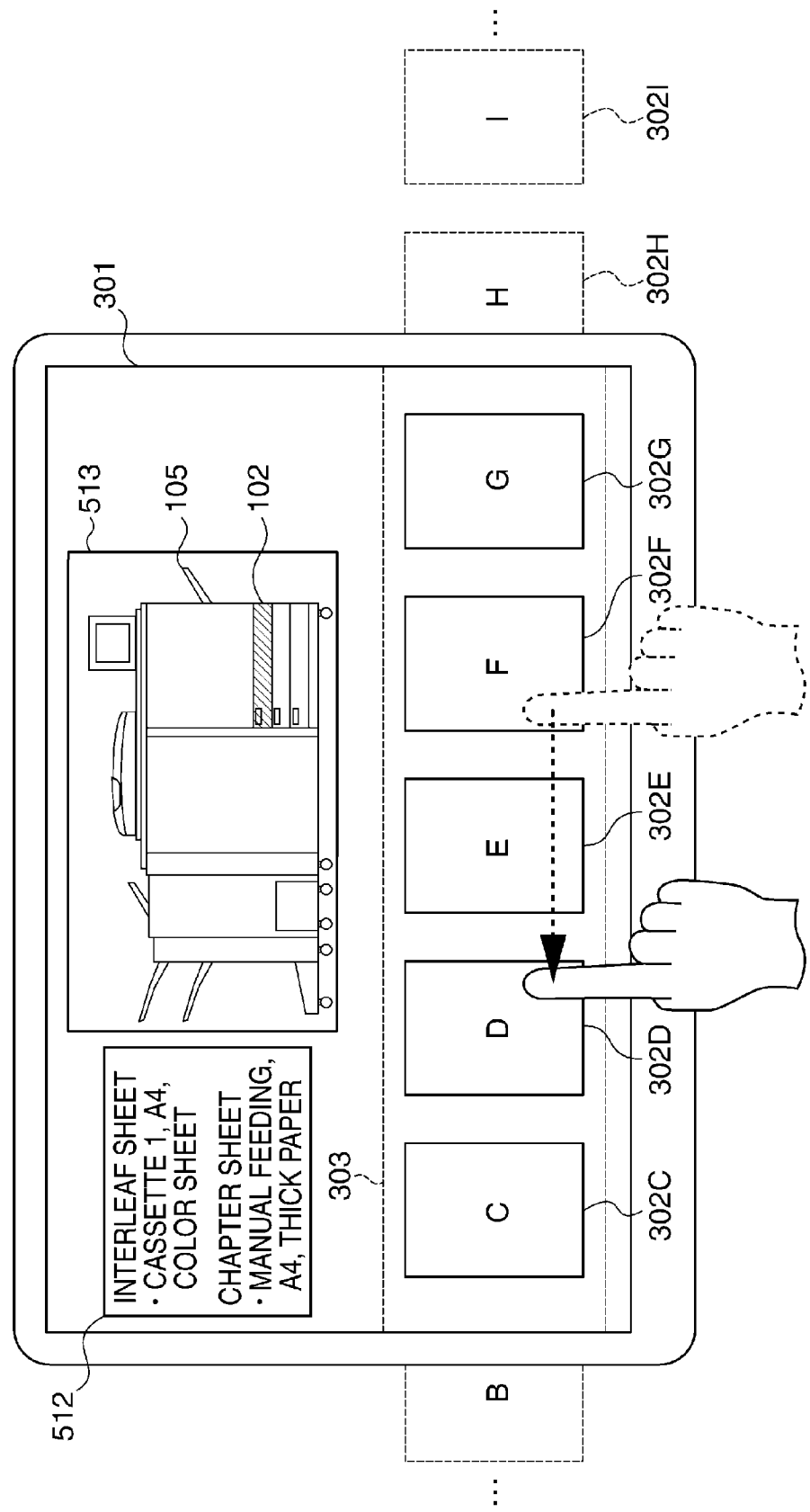

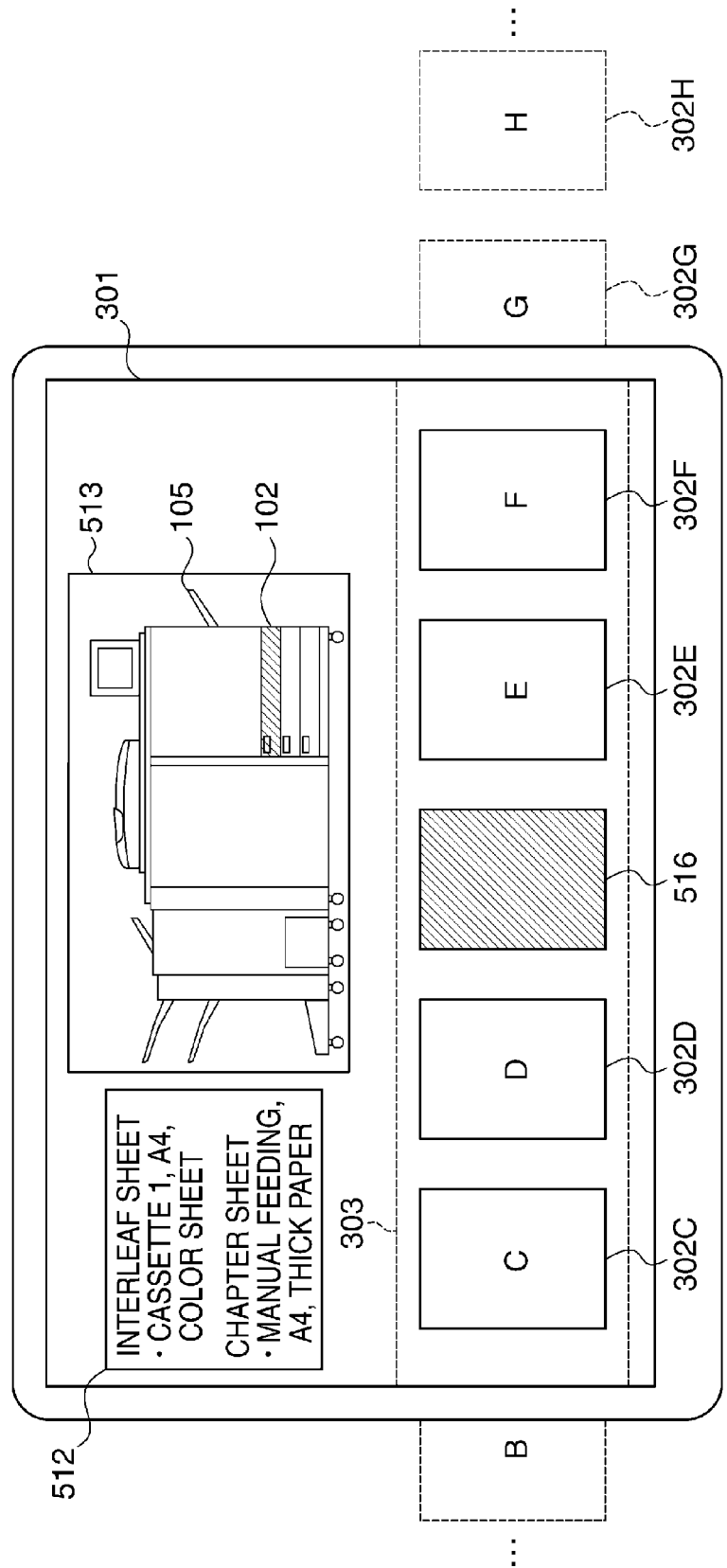

INFORMATION PROCESSING APPARATUS CAPABLE OF SETTING INSERT, IMAGE FORMING APPARATUS, METHOD OF CONTROLLING THE INFORMATION PROCESSING APPARATUS, AND STORAGE MEDIUM

BACKGROUND OF THE INVENTION

1. Field of the Invention

The present invention relates to an information processing apparatus that is capable of setting an insert, an image forming apparatus, a method of controlling the information processing apparatus, and a storage medium.

2. Description of the Related Art

Conventionally, in an image forming apparatus, such as a copy machine, to perform simple image editing or post processing, it is general that the screen displayed on a console section is caused to shift to a screen for a selected one of various processing modes, and detailed settings are configured for the selected processing mode.

An insert insertion mode is known as one of such processing modes of the image forming apparatus. An insert includes an interleaf sheet and a chapter sheet, and the interleaf sheet is a different type of sheet to be inserted between pages of a printed matter as an indication of a partition of pages for easy check of the number of printed pages.

On the other hand, the chapter sheet is a different type of sheet to be inserted between pages of a printed matter similarly to the interleaf sheet, but is used for indicating a partition of chapters, and has an image of an original page printed on one side or both sides thereof, as in the case of an inside title of a booklet.

By using a sheet, such as color paper or a tab sheet, which is different in type from sheets used for printing original pages, for the interleaf sheet or the chapter paper, it is possible to produce a booklet which enables a user to easily view the inside title and a partition of chapters.

According to a conventional method of setting an insert on the console section, it is necessary to shift to a screen for setting the insert insertion mode and switch between a plurality of hierarchical displays, which requires the user to perform go through a procedure of many setting operations and hence is not user-friendly.

Particularly, a method of setting a page where an insert is inserted by inputting a numerical value makes it difficult for the user to grasp an insertion position where the insert is to inserted between original pages, and actual post processing is sometimes not executed at a desired position, which degrades quality of a printed matter or requires reprinting, causing lowering of productivity and resource saving performance.

To solve this problem, there has been proposed a technique in which originals are displayed on a preview screen as preview images, and simple editing of original images and setting of post processing are performed by touch operations on a touch panel while causing results of the editing and setting to be reflected on the preview images, whereafter the original images are printed or post-processed as displayed on the preview screen (see Japanese Patent Laid-Open Publication No. 2004-282439). For example, when inserting an interleaf sheet, a user puts his/her finger on a preview image of the interleaf sheet, and drags the preview image with his/her finger to thereby insert the interleaf sheet between pages.

However, the technique disclosed in Japanese Patent Laid-Open Publication No. 2004-282439 describes the method of operating the preview screen for inserting an interleaf sheet, but does not describe a method of setting an insert on which an original page is printed, such as a chapter sheet.

Therefore, when inserting a chapter sheet by the method disclosed in Japanese Patent Laid-Open Publication No. 2004-282439, it is necessary to print, out of original pages, a page for which a chapter sheet is to be used, on a sheet in advance, and configure the settings such that the printed sheet is inserted as an interleaf sheet. This makes the setting procedure complicated and troublesome.

SUMMARY OF THE INVENTION

The present invention provides an information processing apparatus that is capable of realizing the setting of an insert including an interleaf sheet or a chapter sheet, for an image forming apparatus, by an intuitive operation similar to an actual insertion operation, an image forming apparatus, a method of controlling the information processing apparatus, and a storage medium.

In a first aspect of the present invention, there is provided an information processing apparatus including a touch screen combined with a display section, and a communication unit that communicates with an image forming apparatus, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, the information processing apparatus comprising a preview image display unit configured to cause the display section to display, when printing a document composed of a plurality of pages, an insert image indicative of the insert and preview images indicative of the pages, in a row arranged in an order of pages, and an insert setting unit configured to set, when the insert image is inserted between the adjacent preview images by a user's drag operation, the insert image as an interleaf sheet, and set, when the insert image is superimposed on a preview image by the user's drag operation, the superimposed preview image as a chapter sheet.

In a second aspect of the present invention, there is provided an image forming apparatus that is capable of communicating with an information processing apparatus, and includes a printing unit configured to print an image on a recording sheet, and sheet feeder units each configured to feed the recording sheet to the printing unit, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, and including a preview image display unit configured to cause the display section to display, when printing a document composed of a plurality of pages, an insert image indicative of the insert and preview images indicative of the pages, in a row arranged in an order of pages, and an insert setting unit configured to set, when the insert image is inserted between the adjacent preview images by a user's drag operation, the insert image as an interleaf sheet, and set, when the insert image is superimposed on a preview image by the user's drag operation, the superimposed preview image as a chapter sheet, wherein the insert image is one of an image prepared in advance, a sheet feeder image indicative of each of a plurality of sheet feeder units provided in the image forming apparatus, and an image formed based on information on recording sheets set in the sheet feeder units, the information being acquired from the image forming apparatus, the image forming apparatus comprising a reception unit configured to receive from the information processing apparatus a sheet registration information request which requests information on the recording sheets set in the sheet feeder units, and a transmission unit configured to transmit the information on the recording sheets set in the sheet feeder units in response to the sheet registration information request received by the reception unit.

In a third aspect of the present invention, there is provided a method of controlling an information processing apparatus including a touch screen combined with a display section, and a communication unit that communicates with an image forming apparatus, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, the method comprising causing the display section to display, when printing a document composed of a plurality of pages, an insert image indicative of the insert and preview images indicative of the pages, in a row arranged in an order of pages, and setting, when the insert image is inserted between the adjacent preview images by a user's drag operation, the insert image as an interleaf sheet, and setting, when the insert image is superimposed on a preview image by the user's drag operation, the superimposed preview image as a chapter sheet.

In a fourth aspect of the present invention, there is provided a method of controlling an image forming apparatus that is capable of communicating with an information processing apparatus, and includes a printing unit configured to print an image on a recording sheet, and sheet feeder units each configured to feed the recording sheet to the printing unit, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, and including a preview image display unit configured to cause the display section to display, when printing a document composed of a plurality of pages, an insert image indicative of the insert and preview images indicative of the pages, in a row arranged in an order of pages, and an insert setting unit configured to set, when the insert image is inserted between the adjacent preview images by a user's drag operation, the insert image as an interleaf sheet, and set, when the insert image is superimposed on a preview image by the user's drag operation, the superimposed preview image as a chapter sheet, wherein the insert image is one of an image prepared in advance, a sheet feeder image indicative of each of a plurality of sheet feeder units provided in the image forming apparatus, and an image formed based on information on recording sheets set in the sheet feeder units, the information being acquired from the image forming apparatus, the method comprising receiving from the information processing apparatus a sheet registration information request which requests information on the recording sheets set in the sheet feeder units, and transmitting the information on the recording sheets set in the sheet feeder units in response to the sheet registration information request received by the reception unit.

In a fifth aspect of the present invention, there is provided a non-transitory computer-readable storage medium storing a computer-executable program for causing a computer to execute a method of controlling an information processing apparatus including a touch screen combined with a display section, and a communication unit that communicates with an image forming apparatus, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, wherein the method comprises causing the display section to display, when printing a document composed of a plurality of pages, an insert image indicative of the insert and preview images indicative of the pages, in a row arranged in an order of pages, and setting, when the insert image is inserted between the adjacent preview images by a user's drag operation, the insert image as an interleaf sheet, and setting, when the insert image is superimposed on a preview image by the user's drag operation, the superimposed preview image as a chapter sheet.

In a sixth aspect of the present invention, there is provided a non-transitory computer-readable storage medium storing a computer-executable program for causing a computer to execute a method of controlling an image forming apparatus that is capable of communicating with an information processing apparatus, and includes a printing unit configured to print an image on a recording sheet, and sheet feeder units each configured to feed the recording sheet to the printing unit, the information processing apparatus being capable of performing an operation on the image forming apparatus concerning printing of a document, and being capable of setting an insert including an interleaf sheet indicative of a partition of pages and a chapter sheet indicative of a partition of chapters to a printed matter to be printed by the image forming apparatus, and including a preview image display unit configured to cause the display section to display, when printing a document composed of a plurality of pages, an insert image indicative of the insert and preview images indicative of the pages, in a row arranged in an order of pages, and an insert setting unit configured to set, when the insert image is inserted between the adjacent preview images by a user's drag operation, the insert image as an interleaf sheet, and set, when the insert image is superimposed on a preview image by the user's drag operation, the superimposed preview image as a chapter sheet, wherein the insert image is one of an image prepared in advance, a sheet feeder image indicative of each of a plurality of sheet feeder units provided in the image forming apparatus, and an image formed based on information on recording sheets set in the sheet feeder units, the information being acquired from the image forming apparatus, wherein the method comprises receiving from the information processing apparatus a sheet registration information request which requests information on recording sheets set in the sheet feeder units, and transmitting the information on the recording sheets set in the sheet feeder units in response to the sheet registration information request received by the reception unit.

According to the present invention, it is possible to provide an information processing apparatus that is capable of realizing the setting of an insert including an interleaf sheet or a chapter sheet, for an image forming apparatus, by an intuitive operation similar to the actual insertion operation, an image forming apparatus, a method of controlling the information processing apparatus, and a storage medium.

Further features of the present invention will become apparent from the following description of exemplary embodiments with reference to the attached drawings.

BRIEF DESCRIPTION OF THE DRAWINGS

FIG. 4 is a view of a preview display of scan data displayed on a touch screen display appearing in FIG. 2.

FIGS. 6A to 6C are views useful in explaining a method of setting a sheet feeder that feeds an insert.

FIG. 11i is a diagram showing an example of sheet registration information.

FIGS. 12A and 12B are views useful in explaining a setting method used when double-sided printing is set, by an information processing apparatus (operation terminal) according to a second embodiment of the present invention.

FIGS. 15A and 15B are views useful in explaining a method of printing images on both sides of a chapter sheet.

FIG. 17 is a flowchart of an insert setting process executed in a step in the print process in FIG. 16.

FIGS. 19A to 19D are views useful in explaining a method of setting an insert from sheet cassettes of an apparatus image.

DESCRIPTION OF THE EMBODIMENTS

The present invention will now be described in detail below with reference to the accompanying drawings showing embodiments thereof.

Figure 1:
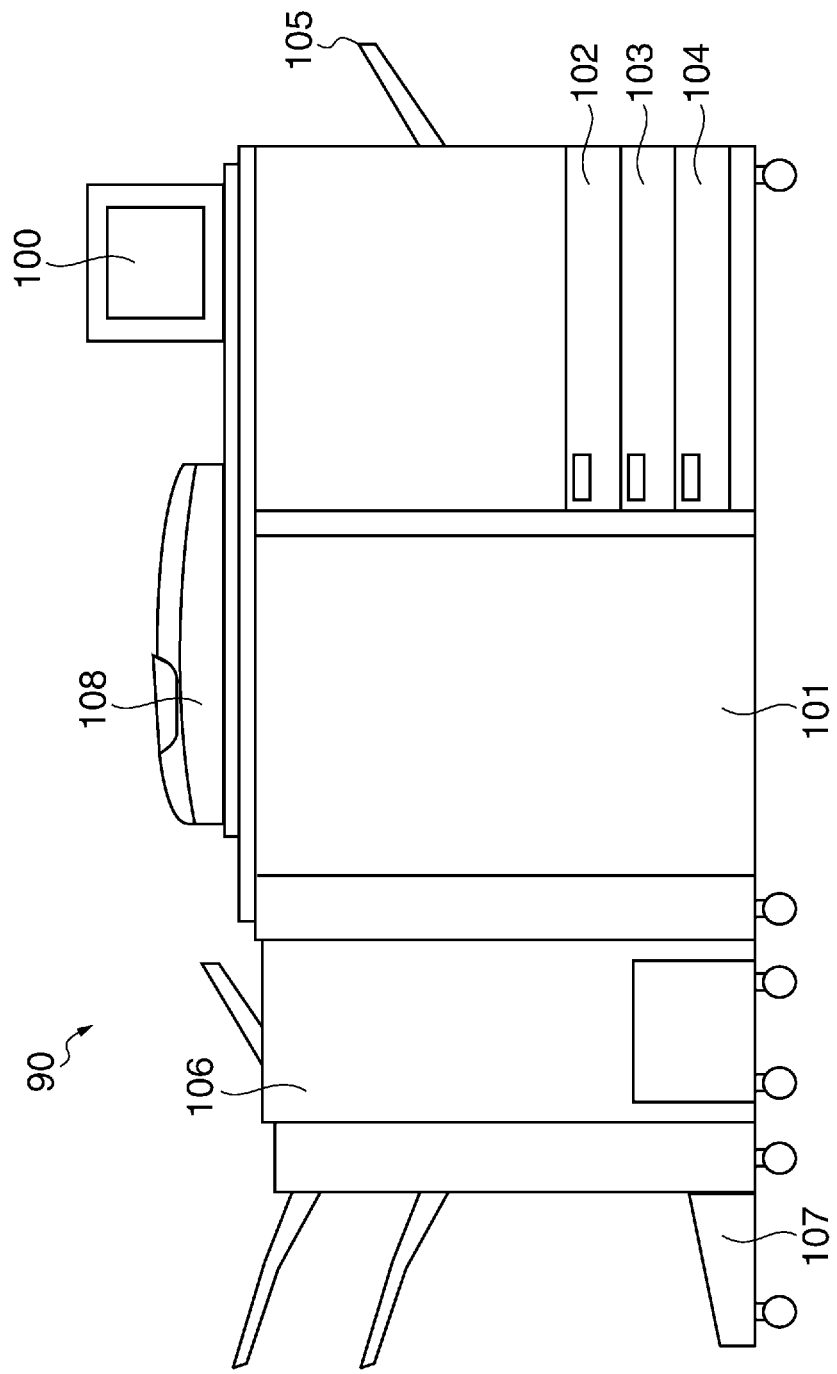
FIG. 1 is a view showing the appearance of an image forming apparatus and an information processing apparatus (operation terminal) according to a first embodiment of the present invention.

FIG. 1 is a view showing the appearance of an image forming apparatus 90 and an operation terminal 100 according to a first embodiment of the present invention.

Referring to FIG. 1, the image forming apparatus 90 is configured such that the operation terminal 100 (information processing apparatus) used for configuring operation settings of the image forming apparatus 90 and for performing a preview operation can be separated from a main unit of the image forming apparatus 90.

The operation terminal 100 may be configured to be an integral part of the image forming apparatus 90, or may be in the form of an electronic terminal, such as a tablet, which is separately used in combination with the main unit of the image forming apparatus 90.

In the present embodiment, it is assumed that the operation terminal 100 is implemented by an electronic terminal, such as a tablet or a smartphone. Further, an operation screen display and control program for a console section, which is necessary for using the electronic terminal as the console section of the present image forming apparatus, is installed in the operation terminal 100 (electronic terminal) which separately downloads the program using e.g. a communication tool of its own.

An MFP unit 101 is e.g. a multi-function printer that realizes functions, such as copy, print, and facsimile transmission and reception functions. In the present embodiment, it is possible to configure the operation settings and execute a preview function, while performing communication between the operation terminal 100 and the MFP unit 101 via a wireless network communication line.

A method of feeding sheets which are recording sheets to the MFP unit 101 includes a method of feeding from sheet cassettes 102 to 104 or a manual feed tray 105. The manual feed tray 105 is used for feeding special sheets, such as thick paper sheets and OHP sheets, which cannot be fed from the sheet cassettes 102 to 104.

Further, by setting sheets prepared in advance in an inserter 106, the sheets can be inserted between desired pages of printed matter.

Sheet information of sheets set in the sheet cassettes 102 to 104, the manual feed tray 105, and the inserter 106, such as sheet sizes and sheet types, can be registered in the MFP unit 101 using the operation terminal 100. The registered sheet information is stored in the MFP unit 101 as sheet registration information. The sheet registration information will be described hereinafter.

A sheet discharge tray 107 is used for discharging sheets which have been printed in the MFP unit 101. An original feeder 108 is used for setting an original thereon when performing scan processing, described hereinafter, whereafter scan processing is started.

The operation terminal 100 can send and receive image data via the wireless communication line. The image data sent and received in this case refers to all image data created by the MFP unit for performing preview, and includes e.g. image data of a preview image which is displayed on the operation terminal, and image data of a menu display and the like for enabling the user to make an instruction input from the console section so as to instruct e.g. a print operation.

By using the operation terminal 100, the user can designate a printing method and post processing using a preview screen and a menu screen displayed thereon.

Figure 2:
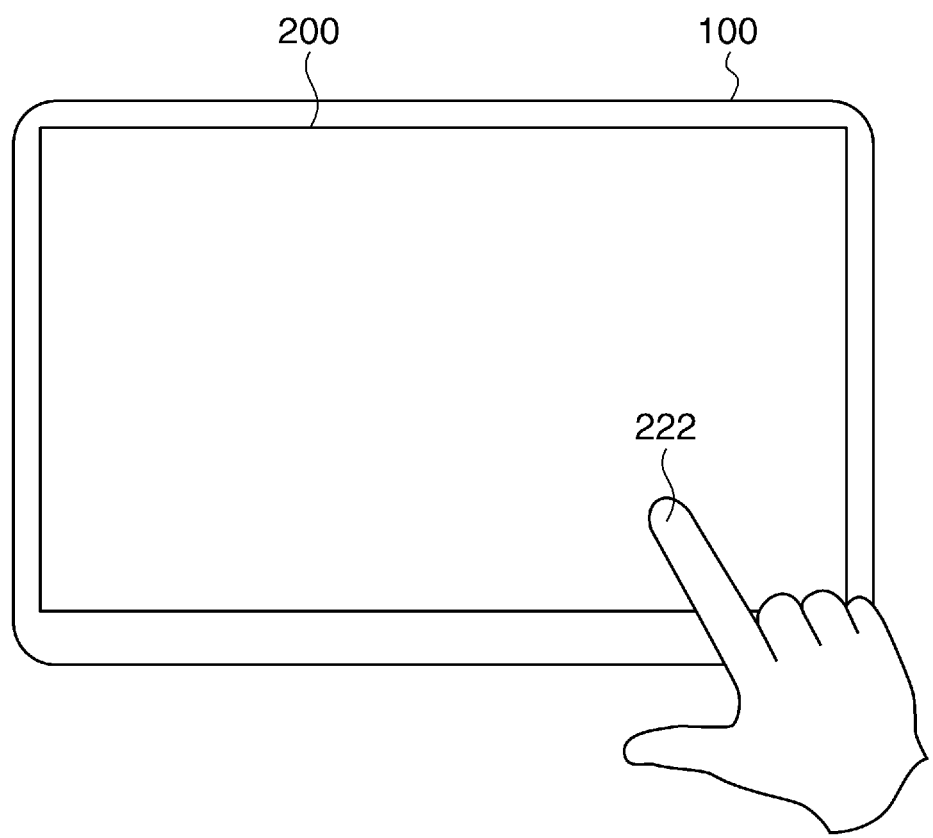
FIG. 2 is a view showing the appearance of the operation terminal appearing in FIG. 1.

FIG. 2 is a view showing the appearance of the operation terminal 100 appearing in FIG. 1.

Referring to FIG. 2, the operation terminal 100 is provided with a touch screen display 200, which can detect a position of an operation (touch) on the touch screen display 200 by a human finger 222, a pen, or the like.

Figure 3:
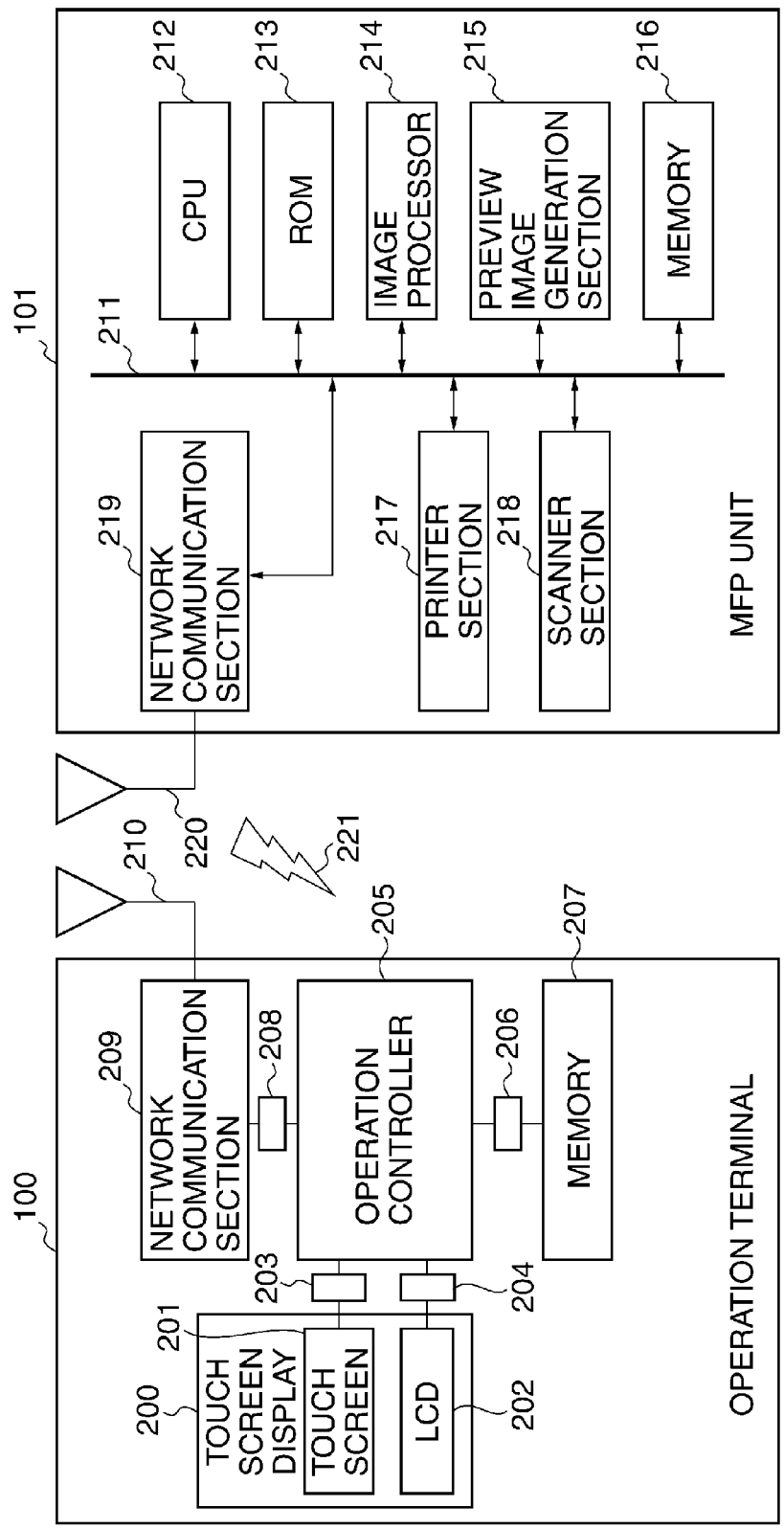
FIG. 3 is a schematic block diagram of an MFP unit and the operation terminal appearing in FIG. 1.

FIG. 3 is a schematic block diagram of the MFP unit 101 and the operation terminal 100 appearing in FIG. 1.

Referring to FIG. 3, the operation terminal 100 comprises an operation controller 205, a network communication section 209 which is a communication unit that communicates with the image forming apparatus 90, a memory 207, the touch screen display 200, and an antenna 210.

The operation controller 205 controls the overall operation of the operation terminal 100. Further, the operation controller 205 includes, though not specifically shown, a CPU, a non-volatile memory in which software information has been written, and so on. Data and information that should be temporarily stored when controlling the operation terminal 100 are temporarily stored in the memory 207 via a memory interface 206.

Through the above-mentioned operations, based on information of coordinates of each touch input by the user from a touch screen 201 and the information temporarily stored in the memory 207, the input is interpreted by software stored in the non-volatile memory, not shown, whereby setting information is generated.

The setting information to be sent to the MFP unit 101 is thus generated and the generated setting information is transmitted via a network interface 208 and the network communication section 209 to the MFP unit 101.

The touch screen display 200 has a double-layered structure formed by laminating the touch screen 201 made of a transparent material and a liquid crystal display 202 disposed under the touch screen 201. Thus, the operation terminal 100 includes the touch screen 201 combined with the liquid crystal display 202 which is a display section.

Operations on the touch screen display 200 can be associated with respective types of processing, including selection of an operation mode, setting of various functions, instruction of an operation, selection and movement of image data during edit processing on image data, and so on.

More specifically, the touch screen display 200 makes it possible, for example, to perform touching, dragging, pinching, flicking, and like other operations, while displaying image data generated by the MFP unit 101, and instruct designation or change of desired coordinate position information of image data, and like other processing.

Further, the operation controller 205 sends and receives data, information, and control signals necessary for the touch screen 201 and the liquid crystal display 202.

More specifically, the touch screen 201 is connected to the operation controller 205 via a touch screen control interface 203, and coordinate information acquired by the touch screen 201 is sent to the operation controller 205.

Further, the liquid crystal display 202 is connected to the operation controller 205 via a liquid crystal display interface 204, and receives image data to be displayed via the liquid crystal display interface 204.

Next, the MFP unit 101 will be described.

The MFP unit 101 comprises a network communication section 219, an antenna 220, a data bus 211, an image processor 214, a preview image generation section 215, a memory 216, a printer section 217, a scanner section 218, a CPU 212, and a ROM 213.

The network communication section 219, the image processor 214, the preview image generation section 215, the memory 216, the printer section 217, the scanner section 218, the CPU 212, and the ROM 213 are connected by the data bus 211.

Bus masters of the data bus 211 are the network communication section 219, the image processor 214, the preview image generation section 215, the printer section 217, the scanner section 218, and the CPU 212, each including a data transfer unit as a so-called DMAC (direct memory access controller), for transferring data to the memory 216. The data bus 211 is mainly used when transferring data transferred from each bus master to the memory 216.

The image processor 214 performs image processing on transferred image data according to print settings sent from the operation terminal 100. The image data which has been subjected to image processing by the image processor 214 is stored in the memory 216.

The preview image generation section 215 reads out the image data which has been subjected to image processing and stored in the memory 216, and forms a preview image to be displayed on the touch screen display 200.

The printer section 217 receives the image data which has been subjected to image processing and stored in the memory 216, and if the printer section 217 is an electrophotographic printer, the printer section 217 generates a laser pulse by PWM modulation and thereby forms a latent image on a photosensitive member. The latent image formed on the photosensitive member is transferred and fixed onto a sheet, and then is output.

The scanner section 218 reads an original using a reading sensor, not shown, and stores image data obtained by converting the read image to digital data in the memory 216. More specifically, after scan processing is selected on an operation screen, not shown, the original set on the original feeder 108 is read by the reading sensor, not shown, as scan data, according to an instruction from the CPU 212. The scan data which has been read is input to the scanner section 218, converted to digital data, and is stored in the memory 216.

The CPU 212 sends the scan data stored in the memory 216 to the image processor 214, where various types of image processing are performed on the scan data, and thereafter the preview image generation section 215 generates a preview image. The generated preview image is stored in the memory 216, and when displaying the preview image on the operation terminal 100, the preview image data stored in the memory 216 is transmitted to the operation terminal 100 by the CPU 212 via a wireless communication line 221.

The above-described operations of the bus masters are controlled by the CPU 212, and the CPU 212 operates according to programs stored in the ROM 213.

As described above, the image forming apparatus 90 is capable of communicating with the operation terminal 100, and includes a printing unit (the printer section 217) configured to print an image on a recording sheet, and a sheet feeder unit (the manual feed tray 105, the sheet cassettes 102 to 104, the inserter 106) configured to feed recording sheets to the printing unit.

Next, a description will be given of network communication between the operation terminal 100 and the MFP unit 101.

The network communication sections 209 and 219 are provided in the operation terminal 100 and the MFP unit 101, respectively, and perform network wireless communication by a WLAN communication method.

The antenna 210 is connected to the network communication section 209 of the operation terminal 100, and the antenna 220 is connected to the network communication section 219 of the MFP unit 101. The network communication sections 209 and 219 each convert communication data to pulse waves for transmission, and vice versa.

The network communication section 219 of the MFP unit 101 converts pulse waves received from the wireless communication line 221 via the antenna 220 to communication data, and sends the communication data to the image processor 214 via the data bus 211.

Further, the network communication section 219 converts communication data received from the image processor 214 via the data bus 211 to pulse waves for transmission, and transmits the pulse waves to the wireless communication line 221 via the antenna 220.

FIG. 4 is a view of a preview display of scan data displayed on the touch screen display 200 appearing in FIG. 2.

Referring to FIG. 4, a preview display 301 displays a plurality of pages of preview images 302A to 302E based on a plurality of scan data items read by the scanner section 218.

By way of example, the preview images 302A to 302E are respective images of alphabets A to E written in an alphabetical order on the respective pages of the scan data.

The operation controller 205 displays the preview images 302 on an object display area 303 using the preview image data received from the MFP unit 101. The term "object" refers to preview image data.

Further, although not displayed on the touch screen display 200, pages 302F, 302G, and so on are assumed to exist as pages following the preview image 302E.

Further, arranged on the preview display 301 are not only the plurality of pages of preview images 302 but also various print setting keys. In the present embodiment, an insert setting key 304 and an other print setting key 305 for configuring print settings other than the insert setting are displayed as examples of the print setting keys. When one of the print setting keys is pressed, the preview display 301 is switched to a screen display for configuring associated print settings, where configuration of the print settings can be started.

FIGS. 5A to 5D are views of a preview display for the insert setting, which is displayed on the touch screen display 200 appearing in FIG. 2.

Note that an interleaf sheet described hereinafter is used for indicating a partition of pages, and no image is printed thereon. On the other hand, a chapter sheet is used for indicating a partition of chapters, and an image is printed thereon. Further, the meaning of the term "insert" is intended to include the interleaf sheet and the chapter sheet.

The preview displays for the insert setting, shown in FIGS. 5A to 5D, are displayed when the insert setting is selected by touching the insert setting key 304 on the preview display 301 shown in FIG. 4, after scan processing has been executed.

Figure 5A:
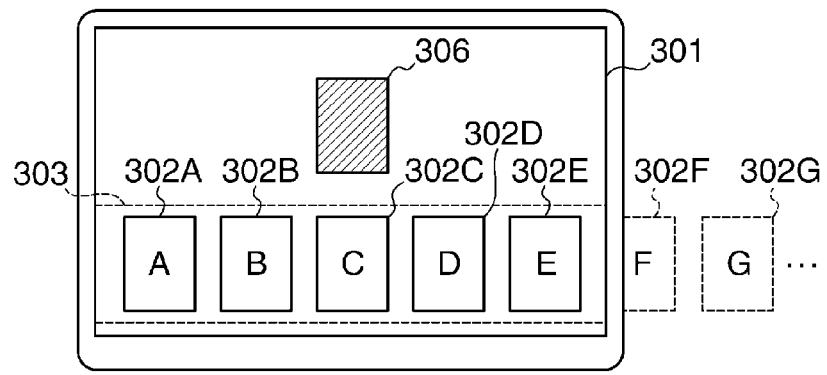
FIGS. 5A to 5D are views of a preview display for insert setting, which is displayed on the touch screen display appearing in FIG. 2.

FIG. 5A shows an initial screen of the preview display for the insert setting. The preview display for the insert setting differs from the preview display shown in FIG. 4 in that an insert preview image 306 is displayed above the object display area 303. The insert preview image displayed on the initial screen is an image prepared in advance. Thus, when printing a document composed of a plurality of pages, there are displayed the insert image (the insert preview image 306) indicative of an insert and the preview images (the plurality of pages of preview images 302) indicative of the respective pages which are arranged in a row in an order of pages.

Figure 5B:
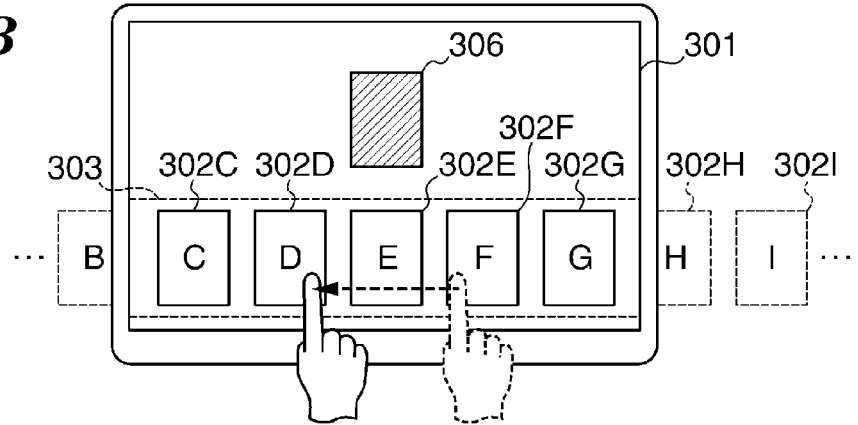

FIG. 5B illustrates a scroll operation.

On the initial screen of the preview display shown in FIG. 5A, when the user performs a touch operation for scrolling the object display area 303 from right to left on the touch screen display 200 as shown in FIG. 5B, the display of the plurality of pages of preview images 302 moves.

By this scroll operation, the user can move the display of the preview images 302 so as to adjust the same such that a position where the user desires to insert the insert appears.

Figure 5C:
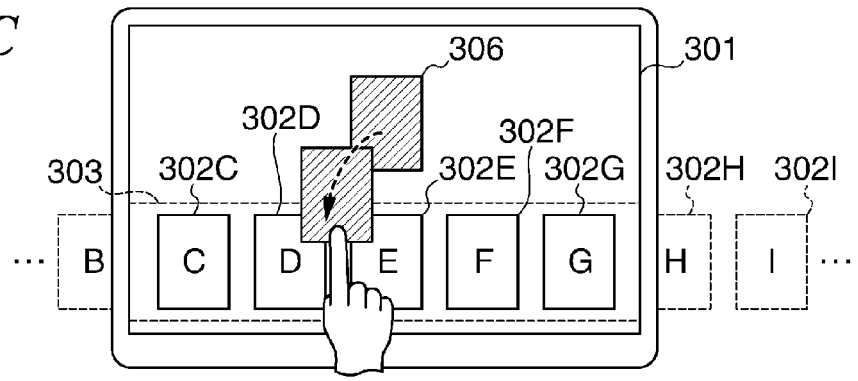

FIG. 5C is a diagram showing an operation for inserting an interleaf sheet.

Referring to FIG. 5C, on the touch screen display 200, the user performs a drag operation for dragging the insert preview image 306 to a position between the preview images 302D and 302E in the object display area 303, and then drops the insert preview image 306 at the position by removing the finger from the touch screen display 200.

By doing this, the position where the interleaf sheet is to be inserted is finalized. Note that the drag operation is an operation of moving a finger on the touch screen display 200, while touching a preview image for selection.

Figure 5D:
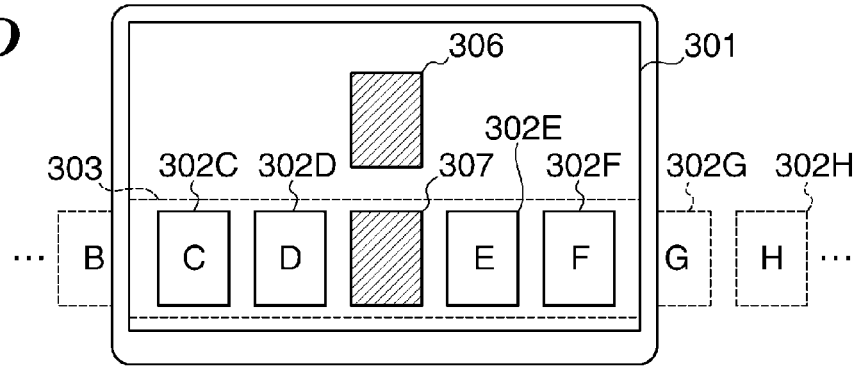

FIG. 5D shows a state where the interleaf sheet has been inserted.

Referring to FIG. 5D, a preview image 307 of the interleaf sheet is displayed in the object display area 303 of the touch screen display 200 in a state inserted between the preview images 302D and 302E, whereby insertion of the interleaf sheet is completed. As described above, in the present embodiment, when an insert image is inserted between adjacent preview images, the insert image is set as the interleaf sheet.

FIGS. 6A to 6C are views useful in explaining a method of setting a sheet feeder from which an insert is to be fed.

FIG. 6A shows a screen displaying an apparatus image 309 of the image forming apparatus for use in setting a sheet feeder.

As shown in FIG. 6A, a message 308 prompting selection of a sheet for the inserted interleaf sheet and the apparatus image 309 of the image forming apparatus are displayed above the object display area 303 of the touch screen display 200.

FIG. 6B is a diagram illustrating an operation for setting a sheet feeder.

As shown in FIG. 6B, the user selects a sheet cassette for the interleaf sheet by touching one of the sheet cassettes 102 to 104, the manual feed tray 105, and the inserter 106. FIG. 6B shows an example in which the user has selected the sheet cassette 102.

FIG. 6C shows details of settings of the sheet.

As shown in FIG. 6C, when the sheet cassette for the interleaf sheet is selected, sheet registration information 315 indicative of sheet settings for the interleaf sheet is displayed based on the sheet information registered in the MFP unit 101 in advance in association with the selected sheet cassette 102.

Then, to complete the insert setting, the user presses a setting completion key 316, whereas to cancel the insert setting, the user presses a setting cancel key 317.

As described above, insertion of the interleaf sheet can be set by the operations performed on the touch screen display 200, shown in FIGS. 5A to 5D, and 6A to 6C. To set insertion of a second and subsequent interleaf sheets, the operation for inserting an interleaf sheet, illustrated in FIGS. 5B to 5D, is repeated. In this case, the sheet feeder for the interleaf sheet has already been set in the sheet feeder setting for the first interleaf sheet, and hence the operation described with reference to FIGS. 6A to 6C is unnecessary. As described above, the sheet feeder images indicative of the respective sheet feeder units included in the image forming apparatus 90 are displayed on the display section, and the user is prompted to select a sheet feeder unit for feeding an insert, which is set as an interleaf sheet or a chapter sheet, from the sheet feeder images displayed on the display section. In the present example, the sheet feeder images are images indicative of the manual feed tray 105, the sheet cassettes 102 to 105, and the inserter 106 included in the apparatus image 309.

Figure 7A:
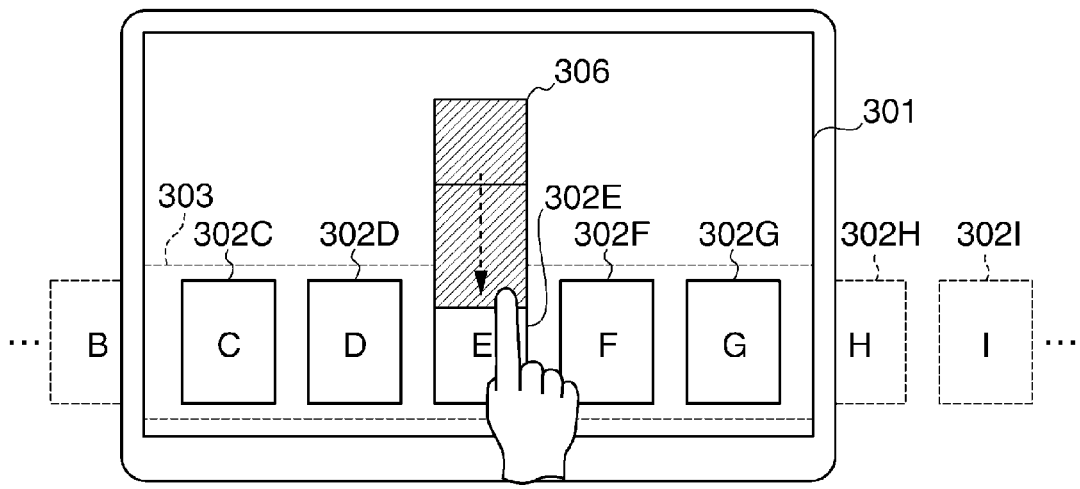
FIGS. 7A and 7B are views useful in explaining a method of inserting a chapter sheet.
Figure 7B:
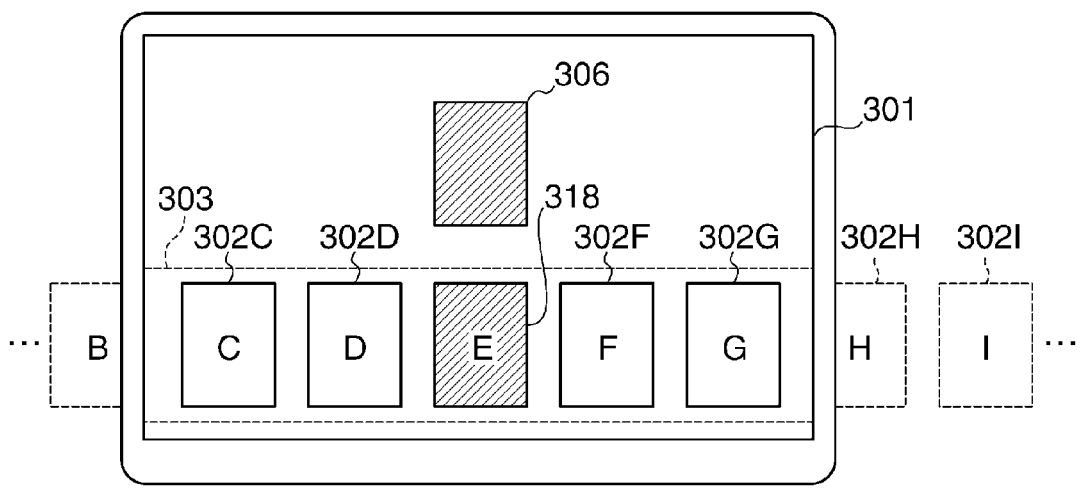

FIGS. 7A and 7B are views useful in explaining a method of inserting a chapter sheet.

Referring to FIG. 7A, the user performs the drag operation for dragging the insert preview image 306 on the touch screen display 200 from a position where the insert preview image 306 is currently displayed to a position of the preview image 302E in the object display area 303 such that the insert preview image 306 is superimposed on the preview image 302E, and drops the insert preview image 306 at the position by removing the finger from the touch screen display 200. By doing this, the position where the chapter sheet is to be inserted is finalized.

As shown in FIG. 7B, a preview image 318 of the chapter sheet is displayed in the object display area 303 of the touch screen display 200 in a manner indicating that the chapter sheet has been inserted to the position of the preview image 302E, whereby insertion of the chapter sheet is completed.

On the chapter sheet inserted in this example, the character E indicated by the preview image 302E is to be printed, as illustrated by the preview image 318 of the chapter sheet. The sheet feeder setting operation to be performed next by the user is the same as the operation described with reference to FIGS. 6A to 6C. As described above, in the present embodiment, in the case where an insert image is superimposed on a preview image by the user's drag operation, the preview image having the insert image superimposed thereon is set as the chapter sheet.

Figure 8A:
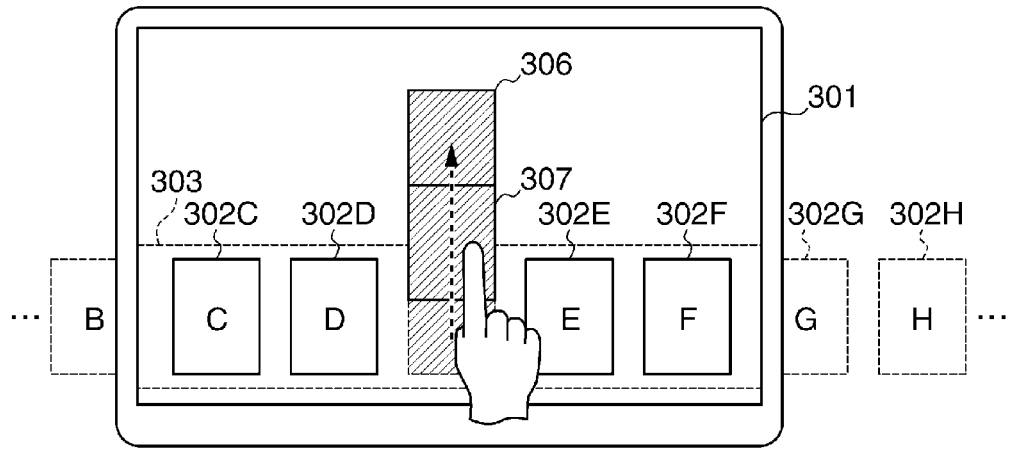
FIGS. 8A to 8C are views useful in explaining a method of undoing insertion of an interleaf sheet and a chapter sheet.
Figure 8B:
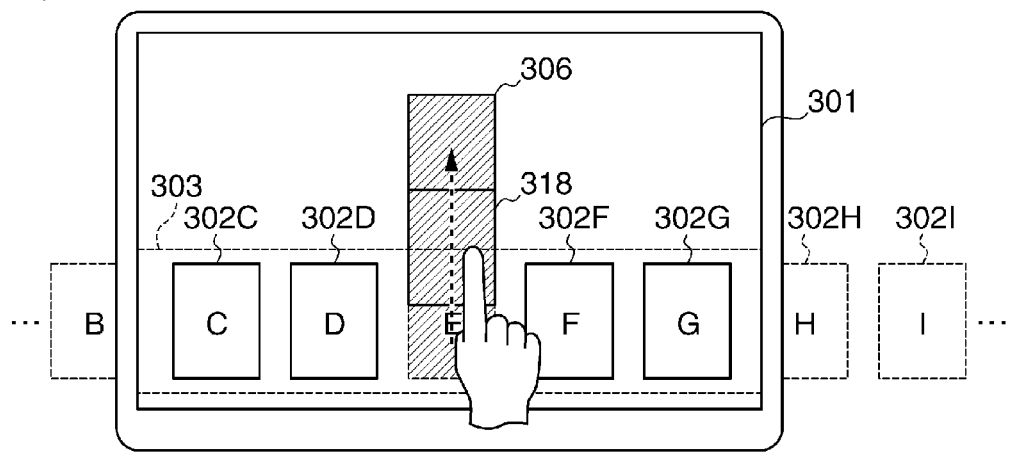
Figure 8C:
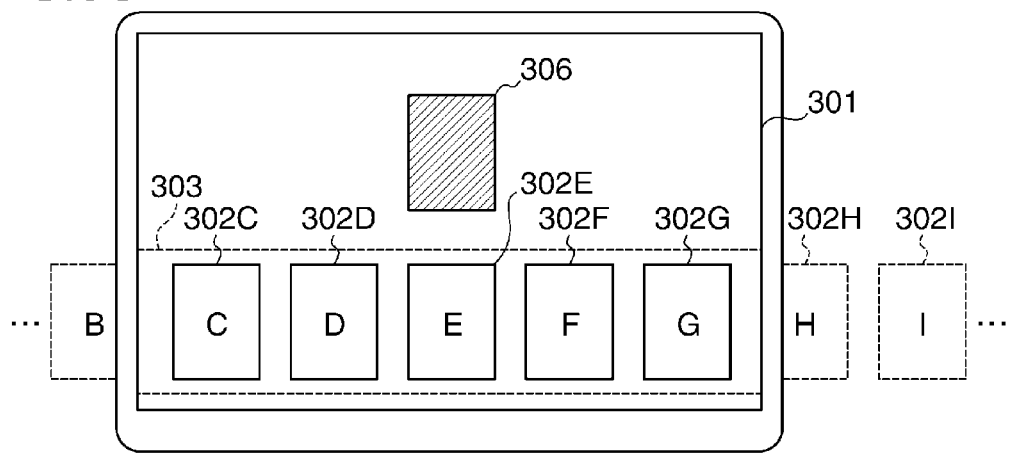

FIGS. 8A to 8C are views useful in explaining a method of undoing insertion of an interleaf sheet and a chapter sheet.

FIG. 8A is a diagram useful in explaining the method of undoing the insertion of the interleaf sheet.

Referring to FIG. 8A, to remove the interleaf sheet inserted as indicated by the preview image 307 of the interleaf sheet shown in FIG. 5D, the preview image 307 of the interleaf sheet is selected as shown in FIG. 8A, and is moved out of the object display area 303 by the drag operation.

FIG. 8B is a diagram useful in explaining the method of undoing insertion of the chapter sheet.

Referring to FIG. 8B, similar to undoing insertion of the interleaf sheet, to undo the insert setting of the chapter sheet, i.e. to remove the chapter sheet inserted as indicated by the preview image 318 of the chapter sheet shown in FIG. 7B, the preview image 318 of the chapter sheet is selected as shown in FIG. 8B, and is moved out of the object display area 303 by the drag operation.

FIG. 8C is a diagram of the screen displayed when insertion of the interleaf sheet or the chapter sheet has been undone.

When the setting of the interleaf sheet or the chapter sheet is canceled i.e. undone, the preview display 301 before inserting the interleaf sheet or the chapter sheet is displayed as shown in FIG. 8C. Thus, it is possible to cancel the insert setting on a page-by-page basis differently from the insert setting canceling method using the above-mentioned setting cancel key 317. As described above, in the present embodiment, when a preview image corresponding to an insert set as an interleaf sheet or a chapter sheet is moved out of the predetermined area (out of the object display area 303) by a user's drag operation, the setting of the interleaf sheet or the chapter sheet is canceled.

Figure 9:
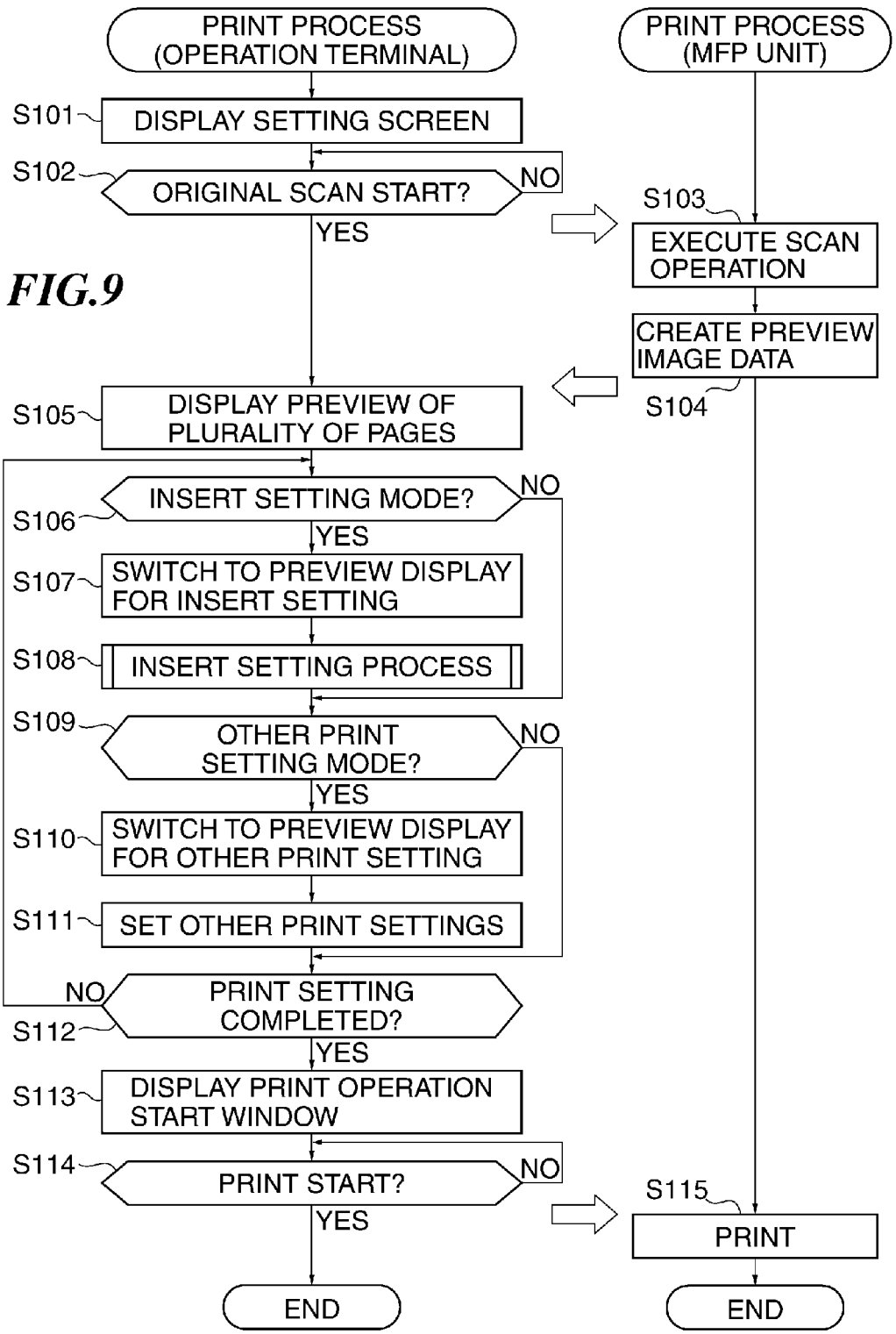
FIG. 9 is a flowchart of a print process executed by an operation controller and a CPU appearing in FIG. 2.

FIG. 9 is a flowchart of a print process executed by the operation controller 205 and the CPU 212, appearing in FIG. 2. The CPU, not shown, of the operation controller 205 of the operation terminal 100 performs part of the print process by reading out a program stored into the memory 207 and executing the program. Further, the CPU 212 of the MFP unit 101 performs the other part of the print process by reading out a program stored in the ROM 213 into the memory 216 and executing the program.

Note that in FIG. 9, arrows illustrated between parts of the flowchart, which represent the parts of the print process executed by the operation controller 205 and the CU 211, respectively, indicate communication performed via the wireless communication line 221, and before communication is performed from one of the operation terminal 100 and the MFP unit 101, part of the print process to be performed by the other is in stoppage.

In the operation terminal 100, the operation controller 205 displays a setting screen displaying various soft key (button) images for setting and instruction, not shown, such as a scan setting button and a scan start button, on the touch screen display 200 (step S101).

Here, it is assumed that a program for displaying the various soft key images for setting and instruction to be displayed on the setting screen has been stored in advance in the memory 207 of the operation terminal 100. Then, when an operation is performed for operating the MFP unit 101, the program is read out from the memory 207 and executed, whereby the setting screen is displayed on the touch screen display 200.

Next, when the start of the operation for scanning an original has been instructed by the user on the touch screen display 200 (YES to the step S102), the operation controller 205 transmits a scan start request indicative of the start of scanning the original to the MFP unit 101. Then, the part of the print process by the operation terminal 100 enters a waiting state.

As the scan start request is transmitted from the operation terminal 100 to the MFP unit 101 via the wireless communication line 221, the MFP unit 101 receives this request, and the CPU 212 sends an original reading start request to the scanner section 218 to thereby start the scan operation (step S103). Then, the scan data generated by the scanner section 218 is stored in the memory 216.

The scan data stored in the memory 216 is sent to the image processor 214, and the CPU 212 generates preview image data based on the scan data on which various types of image processing have been performed (step S104). The generated preview image data is stored in the memory 216 again, and the preview image data stored in the memory 216 is transmitted to the operation terminal 100 by the CPU 212 via the wireless communication line 221.

The operation controller 205 of the operation terminal 100 receives the preview image data transferred from the MFP unit 101, and stores the received data in the memory 207 of the operation terminal 100. Then, the operation controller 205 displays the received data on the touch screen display 200 as a preview of the plurality of pages as shown in FIG. 4 (step S105). The step S105 corresponds to an operation of a preview image display unit.

Then, the operation controller 205 determines whether or not the insert setting has been instructed to be started on the touch screen display 200 (step S106).

If it is determined in the step S106 that the insert setting has not been instructed to be started to be started on the touch screen display 200 (NO to the step S106), the operation controller 205 proceeds to a step S109.

On the other hand, if it is determined in the step S106 that the insert setting has been instructed to be started on the touch screen display 200 (YES to the step S106), the operation controller 205 proceeds to a step S107, wherein the operation controller 205 switches the display screen of the operation terminal 100 to the preview display for the insert setting shown in FIG. 5A (step S107).

Then, the operation controller 205 executes an insert setting process for setting the insert based on operations performed on the preview image for the insert setting, as illustrated in FIGS. 5A to 8C (step S108). The insert setting process will be described in detail hereinafter. The step S108 corresponds to an operation of an insert setting unit.

Next, the operation controller 205 determines whether or not a print setting other than the insert setting has been instructed to be started on the touch screen display 200 (step S109). Note that the print setting other than the insert setting in the present case is the setting started by pressing the other print setting key 305.

If it is determined in the step S109 that the print setting other than the insert setting has not been instructed to be started to be started (NO to the step S109), the operation controller 205 proceeds to a step S112.

On the other hand, if it is determined in the step S109 that the print setting other than the insert setting has been instructed to be started (YES to the step S109), the operation controller 205 displays a preview display for the other print setting on the display screen (step S110). Then, the various print settings are made via operations on the preview for the other print setting (step S111).

Then, the operation controller 205 determines whether or not completion of all print settings has been confirmed on an operation screen, not shown, on the touch screen display 200 (step S112).

If it is determined in the step S112 that completion of all print settings has not been confirmed (NO to the step S112), the operation controller 205 returns to the step S106.

On the other hand, if it is determined in the step S112 that completion of all print settings has been confirmed (YES to the step S112), the operation controller 205 displays a print operation start window, not shown, on the touch screen display 200 (step S113).

Then, when printing has been instructed to be started on the print operation start window (YES to the step S114), the operation controller 205 transmits the print setting information of the above-mentioned various print settings and a print start request to the MFP unit 101 via the wireless communication line 221. Then, the part of the print process by the operation terminal 100 is terminated.

On the other hand, as the print setting information and the print start request are transferred from the operation terminal 100 via the wireless communication line 221, the CPU 212 of the MFP unit 101 receives the information and request, and performs printing based on the print setting information (step S115). Then, the part of the print process by the MFP unit 101 is terminated.

Figure 10:
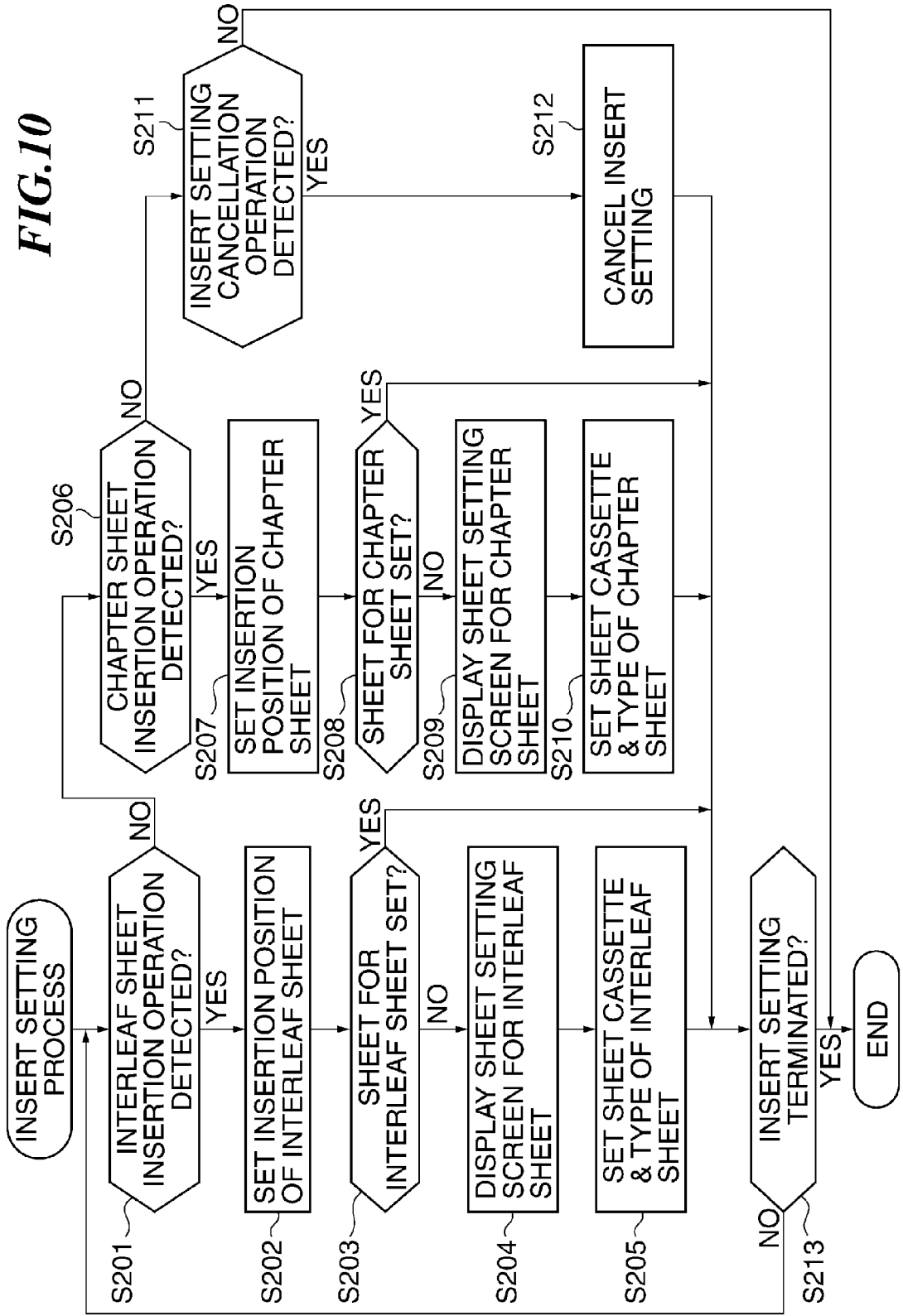
FIG. 10 is a flowchart of an insert setting process executed in a step in the print process in FIG. 9.

FIG. 10 is a flowchart of the insert setting process executed in the step S108 in the print process in FIG. 9. The CPU of the operation controller 205 performs the insert setting process in FIG. 10 by reading out a program stored in the memory 207 and executing the program.

Steps S201 to S205 in FIG. 10 are executed for the setting of insertion of an interleaf sheet.

Referring to FIG. 10, the operation controller 205 determines whether or not insertion of the interleaf sheet, described with reference to FIGS. 5A to 5D, has been detected on the preview display for the insert setting (step S201).

More specifically, as shown in FIG. 5C, the operation controller 205 determines whether or not the drag operation for moving the insert preview image 306 to a position between two pages of the preview images 302 in the object display area 303 has been performed, i.e. whether or not an operation for inserting an interleaf sheet has been detected.

If it is determined in the step S201 that an operation for inserting an interleaf sheet has not been detected (NO to the step S201), the operation controller 205 proceeds to a step S206.

On the other hand, if it is determined in the step S201 that an operation for inserting an interleaf sheet has been detected (YES to the step S201), the operation controller 205 updates the display on the touch screen display 200 to the preview image on which the interleaf sheet has been inserted as shown in FIG. 5D. Then, insertion position information of the interleaf sheet is stored in the memory 207 of the operation terminal 100 to thereby set the insertion position of the interleaf sheet (step S202).

The operation controller 205 refers to the insert setting information stored in the memory 207 of the operation terminal 100 to thereby determine whether or not a sheet for the interleaf sheet has been set (step S203).

If it is determined in the step S203 that the sheet for the interleaf sheet has been set (YES to the step S203), the operation controller 205 proceeds to a step S213.

On the other hand, if it is determined in the step S203 that the sheet for the interleaf sheet has not been set (NO to the step S203), the operation controller 205 displays the sheet setting screen for the interleaf sheet, shown in FIG. 6A, on the touch screen display 200 (step S204).

Next, when selection of a sheet cassette for the interleaf sheet by the user, as described with reference to FIG. 6B, has been detected, the operation controller 205 transmits a request to the MFP unit 101 for transferring part, associated with the designated sheet cassette, of the sheet registration information registered in the MFP unit 101 in advance. The sheet registration information will be described hereinafter with reference to FIG. 11.

Then, the operation controller 205 stores sheet registration information received from the MFP unit 101 in the memory 207 of the operation terminal 100 as the insert setting of the interleaf sheet, and displays the sheet registration information 315 of the interleaf sheet on the touch screen display 200 as shown in FIG. 6C. Thus, the sheet cassette and the type of the interleaf sheet are set (step S205).

Then, the operation controller 205 determines whether or not the setting completion key 316 for the insert, described with reference to FIG. 6C, has been pressed by the user, i.e. whether or not the insert setting has been terminated (step S213).

If it is determined in the step S213 that the insert setting has not been terminated (NO to the step S213), the operation controller 205 returns to the step S201, whereas if the insert setting has been terminated (YES to the step S213), the present process is terminated.

Referring back to the step 3201, if it is determined in the step S201 that an operation for inserting an interleaf sheet has not been detected (NO to the step S201), the operation controller 205 determines whether or not an operation for inserting a chapter sheet has been detected (step S206).

The step S206 and steps S207 to S210 are executed for the setting of insertion of a chapter sheet. The steps S206 to S210 differ from the steps S201 to S205 for the setting of insertion of an interleaf sheet in that it is determined in the step S206 whether or not an insertion operation performed on the preview display for the insert setting as described with reference to FIGS. 7A and 7B has been detected.

More specifically, it is determined whether or not there is detected a drag operation performed, as illustrated in FIG. 7A, for moving the insert preview image 306 to one of pages of the preview images 302 in the object display area 303 in a manner superimposed thereon.

If it is determined in the step S206 that an operation for inserting the chapter sheet has not been detected (NO to the step S206), the operation controller 205 proceeds to a step S211.

On the other hand, if it is determined in the step S206 that an operation for inserting the chapter sheet has been detected (YES to the step S206), the operation controller 205 updates the display on the touch screen display 200 to the preview image in which the chapter sheet has been inserted as shown in FIG. 7B. Then, the operation controller 205 stores insertion position information of the chapter sheet in the memory 207 of the operation terminal 100 to thereby set the insertion position of the chapter sheet (step S207).

The operation controller 205 refers to the insert setting information stored in the memory 207 of the operation terminal 100 to thereby determine whether or not a sheet for the chapter sheet has been set (step S208).

If it is determined in the step S208 that a sheet for the chapter sheet has been set (YES to the step S208), the operation controller 205 proceeds to the step S213.

On the other hand, if it is determined in the step S208 that a sheet for the chapter sheet has not been set (NO to the step S208), the operation controller 205 displays the sheet setting screen for the chapter sheet on the touch display screen 200 (step S209).

Next, when selection of a sheet cassette for the chapter sheet by the user has been detected, the operation controller 205 transmits a request to the MFP unit 101 for transferring part, associated with the designated sheet cassette, of the sheet registration information registered in the MFP unit 101 in advance.

Then, the operation controller 205 stores sheet registration information received from the MFP unit 101 in the memory 207 of the operation terminal 100 as the insert setting of the chapter sheet, and displays the sheet registration information 315 of the chapter sheet on the touch screen display 200. Thus, the sheet cassette and the type of the chapter sheet are set (step S210), and the operation controller 205 proceeds to the step S213.

Referring back to the step S206, if it is determined in the step S206 that an operation for inserting a chapter sheet has not been detected (NO to the step S206), the operation controller 205 proceeds to the step S211, wherein the operation controller 205 determines whether or not an operation for removal of the insert, described with reference to FIG. 8A or 8B, has been detected on the preview display for the insert setting on which the interleaf sheet or the chapter sheet has been inserted (step S211).

More specifically, as illustrated in FIG. 8A or 8B, whether or not there is detected a drag operation performed for moving the preview image 307 of the interleaf sheet or the preview image 318 of the chapter sheet, which has been inserted in the object display area 303, out of the object display area 303.

If it is determined in the step S211 that an operation for removal of the insert has not been detected (NO to the step S211), the present process is terminated.

On the other hand, if it is determined in the step S211 that an operation for removal of the insert has been detected (YES to the step S211), the operation controller 205 updates the display on the touch screen display 200 to the preview display in which the insert setting has been canceled as shown in FIG. 8C. Then, the operation controller 205 deletes information on the insert setting of the insert which has been canceled from the memory 207 of the operation terminal 100 to thereby cancel the insert setting (step S212), and then proceeds to the step S213.

According to the insert setting process in FIG. 10, in the case where an insert image is inserted between adjacent preview images by the user's drag operation, the insert image is set as the interleaf sheet, and in the case where an insert image is superimposed on a preview image, the superimposed preview image is set as the chapter sheet. As a result, the setting of the insert, i.e. interleaf sheet or the chapter sheet, on the image forming apparatus, can be realized by an intuitive operation similar to the actual insertion operation.

FIG. 11 is a diagram showing an example of the sheet registration information.

Referring to FIG. 11, the sheet registration information, denoted by reference numeral 602, indicates that color sheet A is registered for sheet cassette 1, color sheet B is registered for sheet cassette 2, color sheet C is registered for sheet cassette 3, a tab sheet is registered for the manual feed tray 105, and no sheet is registered for the inserter 106.

Note that sheet cassette 1 corresponds to the sheet cassette 102, sheet cassette 2 to the sheet cassette 103, and sheet cassette 3 to the sheet cassette 104.

As mentioned above, the sheet registration information 602 includes respective registrations of sheet types associated with the sheet cassettes, the manual feed tray, and the inserter, respectively.

As described above, in the present embodiment, the user can determine the insertion position of an interleaf sheet or a chapter sheet by performing, on the preview display, an operation for inserting an insert image between preview images of original pages, or an operation for superimposing an insert image on a preview image of an original page. This enables the user to more intuitively perform insert setting for the interleaf sheet and the chapter sheet.

Next, a description will be given of a second embodiment of the present invention. The second embodiment has the same hardware configuration as the first embodiment and the same software configuration as the first embodiment except a point described in detail hereinafter, and hence components corresponding to those of the first embodiment are denoted by the same reference numerals, and description thereof is omitted. In the first embodiment, the preview display for the insert setting is specialized to single-sided printing. In the second embodiment, it is possible to employ an insert setting method suited to double-sided print setting.

First, a description will be given of the concept of an operation intuitively performed by a user with his/her finger using an operation unit of a touch screen display method, for executing the insert setting on the touch screen display 200 using the preview function.

FIGS. 12A and 12B are views useful in explaining a setting method used when double-sided printing is set.

FIG. 12A shows a preview display of scan data displayed on the touch screen display 200.

The preview display, denoted by reference numeral 301, in FIG. 12A displays not only the preview display shown in FIG. 4, but also a double-sided print setting key 401. When the double-sided print setting key 401 is pressed, double-sided printing is set as shown in FIG. 12B.

FIG. 12B shows a preview display of scan data in the double-sided print setting, displayed on the touch screen display 200.

Referring to FIG. 12B, a plurality of pages of preview images 402 are displayed in the object display area 303 such that two pages form a pair of front and back sides of one sheet. For example, as shown in FIG. 12B, pairs of preview images 402A and 402B, 402C and 402D, and 402E and 402F form respective pairs of front and back sides of sheets, for double-sided printing.

Further, not only the plurality of pages of preview images 402 each two of which form a pair of front and back sides, but also a single-sided print setting key 403 is disposed. The single-sided print setting key 403 is displayed in place of the double-sided print setting key 401. When the single-sided print setting key 403 is pressed, the single-sided printing is set, and the display is switched to the preview display for the single-sided print setting shown in FIG. 12A.

FIGS. 13A to 13D are views of a preview display displayed on the touch screen display 200 for the insert setting when the double-sided printing is set.

The preview display for the insert setting at the time of the double-sided printing being set is displayed when the insert setting is selected by touching the insert setting key 304 on the preview display 301 in FIG. 12B. As described above, in the present embodiment, in the case where a printed matter is to be produced by executing double-sided printing, the preview images are displayed in a manner clearly indicating that each adjacent preview images indicative of two pages to be printed on one recording sheet form a pair. In this example, broken lines are used for clearly indicating that preview images indicative of each two pages form a pair.

Figure 13A:
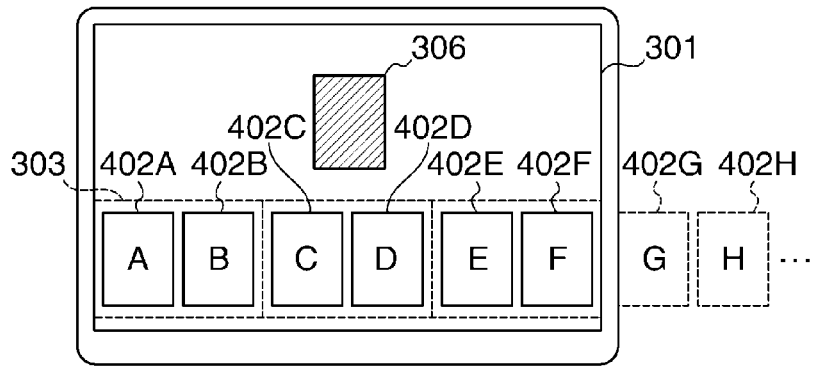
FIGS. 13A to 13D are views of a preview display for insert setting when double-sided printing is set, which is displayed on the touch screen display.

FIG. 13A shows an initial screen of the preview display for the insert setting.

Referring to FIG. 13A, similar to FIG. 5A, the insert preview image 306 is displayed above the object display area 303.

Figure 13B:
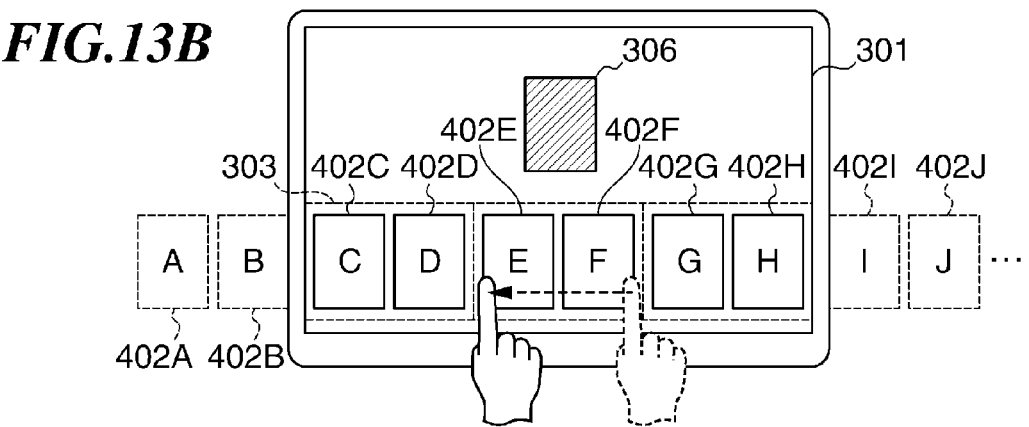

FIG. 13B is a diagram showing a scroll operation.

As shown in FIG. 13B, similar to FIG. 5B, by performing the touch operation for scrolling the object display area 303 from right to left, the display of the plurality of pages of preview images 402 can be moved.

Figure 13C:
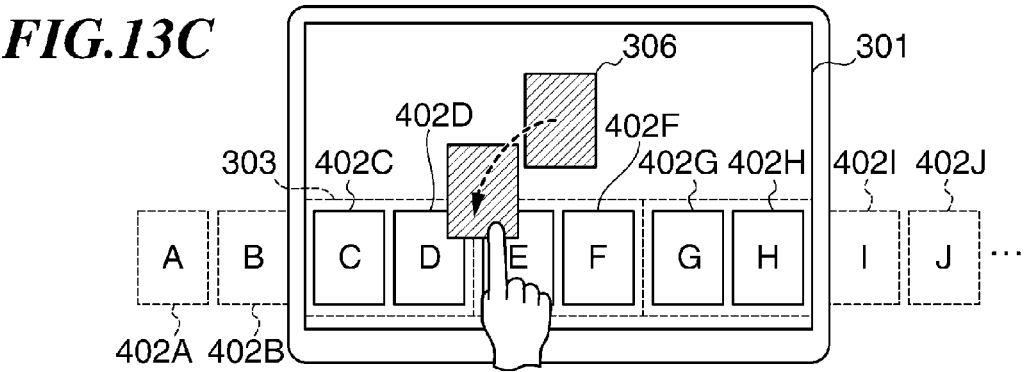

FIG. 13C is a diagram showing an operation for inserting an interleaf sheet.

To insert an interleaf sheet, as shown in FIG. 13C, on the touch screen display 200, the user drags the insert preview image 306 to a position between the preview images 402D and 402E in the object display area 303, and drops the insert preview image 306 at the position by removing the finger from the touch screen display 200. Thus, in the present embodiment, in the case where an insert image is inserted between adjacent pairs of preview images, the insert image is set as an interleaf sheet.

Figure 13D:
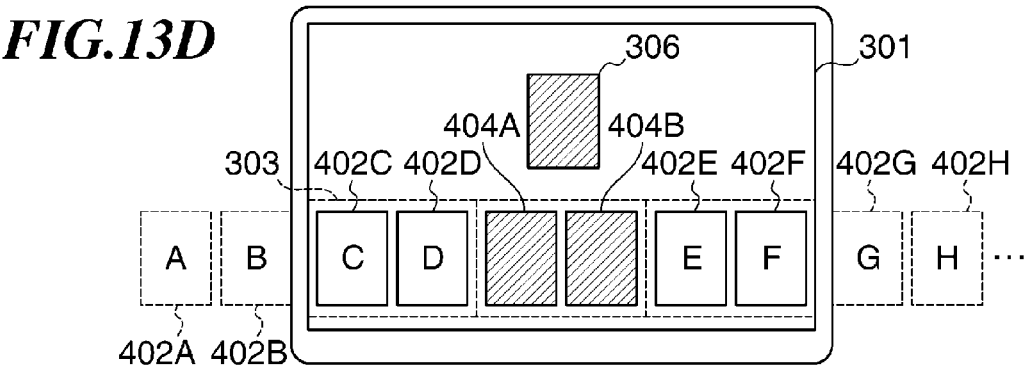

FIG. 13D is a diagram showing a state where the interleaf sheet has been inserted.

As shown in FIG. 13D, there are displayed preview images 404A and 404B for two pages of the interleaf sheet forming a pair of front and back sides thereof, which have been inserted between the preview images 402D and 402E in the object display area 303 on the touch screen display 200, whereby the setting of insertion of the interleaf sheet is completed.

At this time, images of the original page are not printed on the interleaf sheet, the insertion position is limited to a position between the back side of the preceding page and the front side of the next page, as in the case of between the preview images 402B and 402C and between the preview images 402D and 402E. That is, the operation controller 205 detects the setting of insertion of an interleaf sheet by detecting an operation for inserting the insert image of the interleaf sheet between the preview image of the back side of the preceding page and the preview image of the front side of the next page.

FIGS. 14A to 14D are views useful in explaining a method of inserting a chapter sheet.

The operation for moving, on the preview screen for the insert setting, the display of the preview images 402 such that a position where the user desires to insert an insert appears is the same as that described hereinabove with reference to FIG. 5B.

Figure 14A:
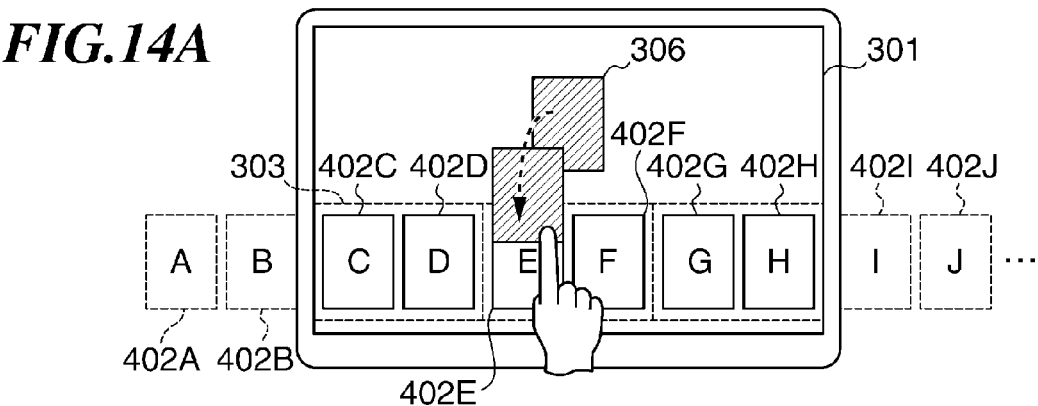
FIGS. 14A to 14D are views useful in explaining a method of inserting a chapter sheet.

A chapter sheet can have an image of an original page printed on the front side or the back side thereof, or can have images of original pages printed on both sides thereof. To print the image of the original page on the front side of the chapter sheet, the user drags, as illustrated in FIG. 14A, the insert preview image 306 to a position of the preview image 402E which is the front page in the object display area 303 such that the insert preview image 306 is superimposed on the preview image 402E, and drops the insert preview image 306 at the position by removing the finger from the touch screen display 200.

Figure 14B:
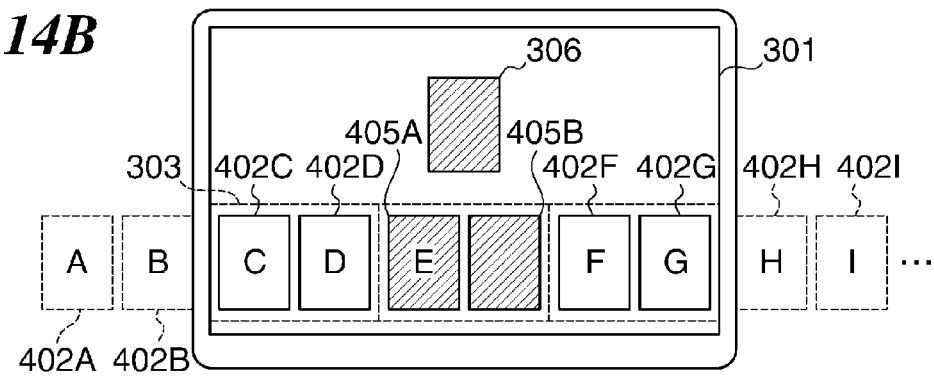

By doing this, as shown in FIG. 14B, there are displayed preview images 405A and 405B of the chapter sheet set such that the front side thereof is to have the character E indicated by the preview image 302E printed thereon, and the back side thereof is blank.

Further, the page of the preview image 402F and the subsequent pages are shifted from respective positions thereof in FIG. 14B by one page corresponding to the inserted preview image 405B, which is blank, of the chapter sheet.

Figure 14C:
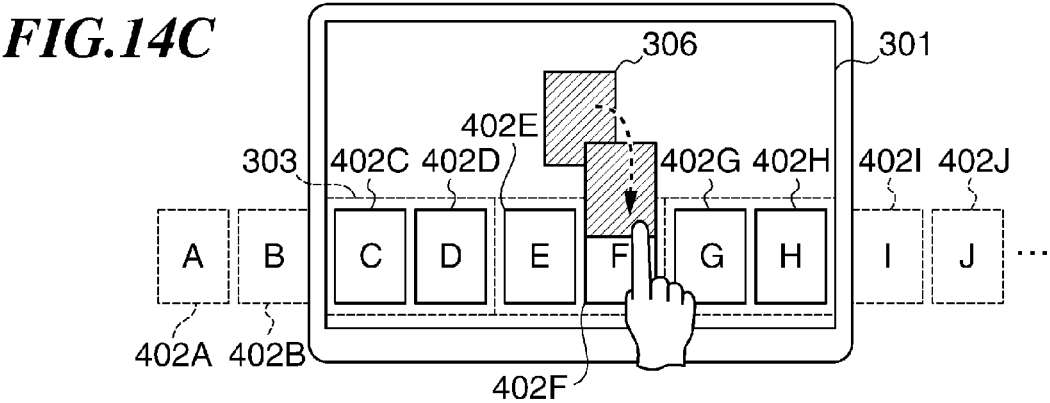

To print an image of an original page on the back side of the chapter sheet, the user drags, as illustrated in FIG. 14C, the insert preview image 306 to a position of the preview image 402F which is a reverse page in the object display area 303 such that the insert preview image 306 is superimposed on the preview image 402F, and drops the insert preview image 306 at the position by removing the finger from the touch screen display 200.

Figure 14D:
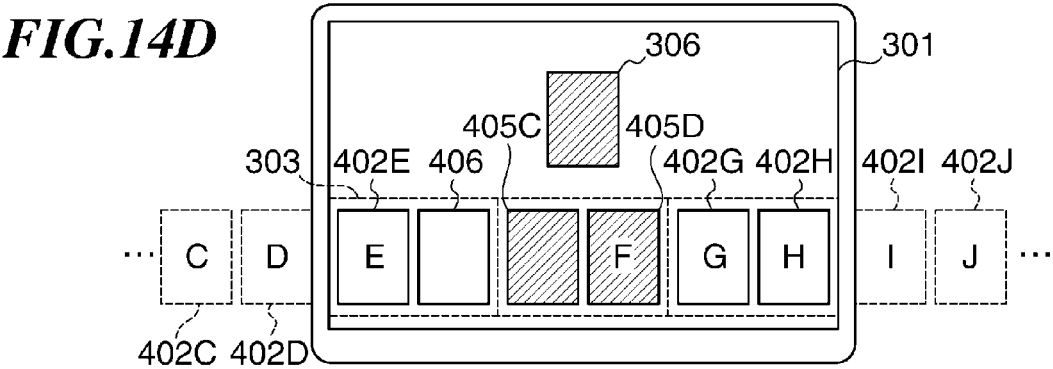

By doing this, as shown in FIG. 14D, there are displayed preview images 405C and 405D of the chapter sheet set such that the back side thereof is to have the character F indicated by the preview image 402E printed thereon, and the front side thereof is blank. Further, a preview image 406 which is blank is inserted in a position of a page corresponding to a side reverse to the preview image 402E.

FIGS. 15A and 15B are views useful in explaining a method of printing images on both sides of a chapter sheet.

To print images of original pages on both sides of a chapter sheet, the user drags the insert preview image 306 to a position between the preview images 402E sand 402F forming a pair in the object display area 303, and drops the insert preview image 306 at the position by removing the finger from the touch screen display 200.

By doing this, as shown in FIG. 15B, there are displayed preview images 405E and 405F of the chapter sheet set such that the front side thereof is to have the character E indicated by the preview image 402E printed thereon, and the back side thereof is to have the character F indicated by the preview image 402F printed thereon.

As described above, in the case where a chapter sheet is inserted when double-sided printing is set, the operation controller 205 detects the setting of insertion of a chapter sheet which is to have an original image printed on only one side thereof by detecting an operation for moving the insert image onto a preview image of an original page desired to be printed on the chapter sheet, and detects the setting of insertion of a chapter sheet for double-sided printing by detecting an operation for moving the insert image to a position between preview images of the front and reverse sides of an original page.

Note that the sheet setting method for the interleaf sheet or the chapter sheet in the second embodiment is the same as the method described with reference to FIGS. 6A to 6C, and hence description thereof is omitted. As described above, in the present embodiment, in the case where an insert image is superimposed on one of preview images forming a pair, the preview image having the insert image superimposed thereon is set as the chapter sheet. Further, in the case where the insert image is superimposed on both of the preview images forming a pair, the two preview images forming the pair are set as the chapter sheet.

Figure 16:
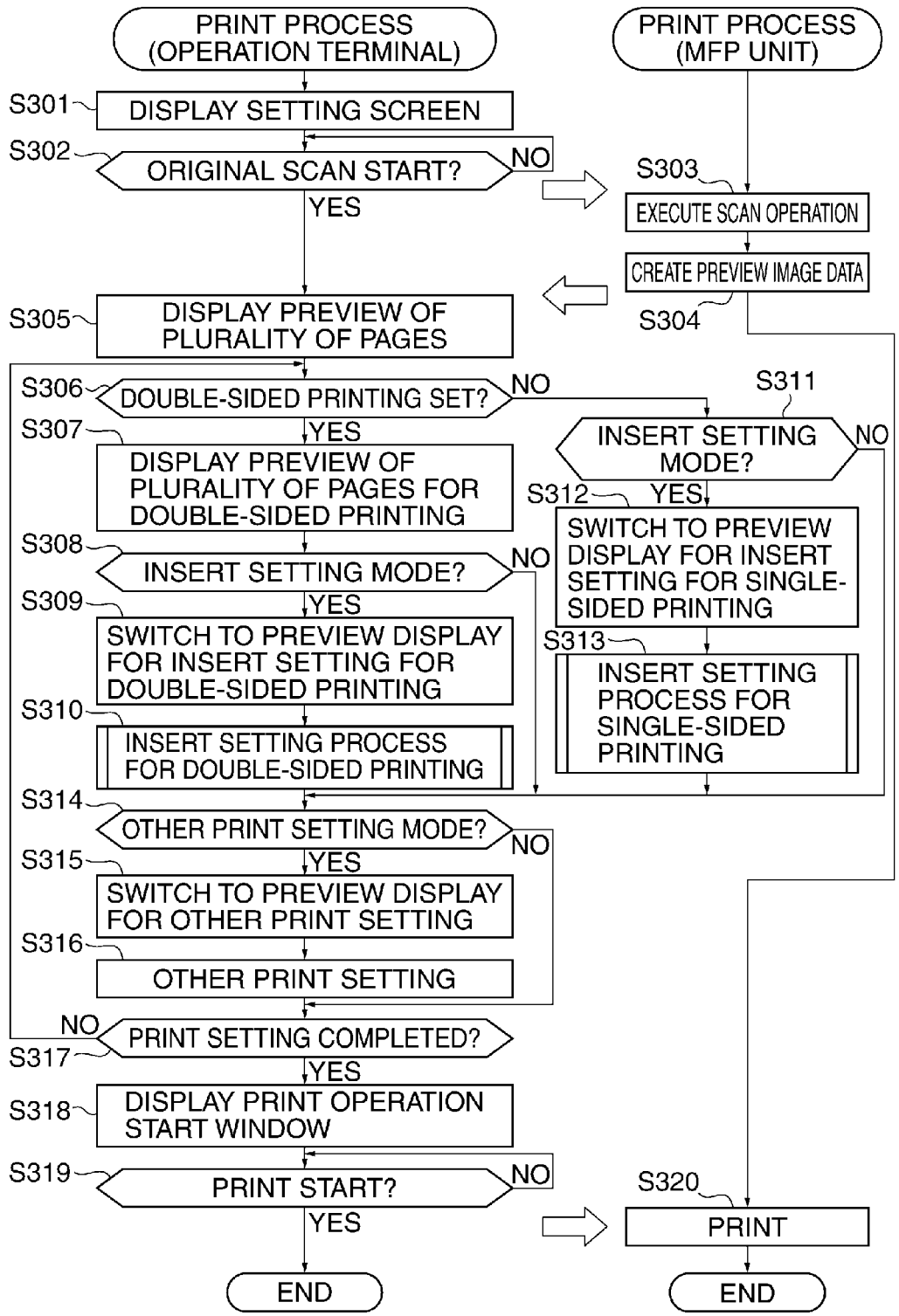
FIG. 16 is a flowchart of a print process executed by the operation controller and the CPU appearing in FIG. 2.

FIG. 16 is a flowchart of a print process executed by the operation controller 205 and CPU 212, appearing in FIG. 2. The CPU of the operation controller 205 performs part of the print process by reading out a program stored in the memory 207 and executing the program. Further, the CPU 212 of the MFP unit 101 performs the other part of the print process by reading out a program stored in the ROM 213 into the memory 216 and executing the program.

Steps S301 to S305 in FIG. 16 are the same as the steps S101 to S105 in FIG. 9. Further, steps S314 to S320 are the same as the steps S109 to S115. Further, steps S311 to S313 are substantially the same as the steps S106 to S108 since the steps S106 to S108 are assumed to be for single-sided printing.

Therefore, the print process in FIG. 16 differs from that in FIG. 9 in steps S306 to S310, and hence these steps will be described.

The operation controller 205 of the operation terminal 100 determines whether or not the double-sided print setting has been designated (step S306). In this step, if a depression is detected at coordinates of the double-sided print setting key 401 shown in FIG. 12A, it is determined the double-sided print setting has been designated.

If it is determined in the step S306 that the double-sided print setting has been designated (YES to the step S306), the operation controller 205 displays the preview of the plurality of pages at the time of double-sided printing being set on the touch screen display 200, as shown in FIG. 12B (step 3307).

Next, the operation controller 205 determines whether or not the insert setting has been instructed to be started on the touch screen display 200 (step S308). If it is determined in the step S308 that the insert setting has not been instructed to be started (NO to the step S308), the operation controller 205 proceeds to the step S314.

On the other hand, if it is determined in the step S308 that the insert setting has been instructed to be started (YES to the step 3308), the operation controller 205 proceeds to a step S309, wherein the operation controller 205 switches the display screen on the touch screen display 200 to the preview display for the insert setting for double-sided printing, shown in FIG. 13A.

Then, the operation controller 205 executes an insert setting process for double-sided printing, in which insert setting is performed based on an operation on the preview images for the insert setting, described hereinabove with reference to FIGS. 13A to 15B (step S310). The insert setting process for double-sided printing will be described hereafter.

FIG. 17 is a flowchart of the insert setting process executed in the step S310 in the print process in FIG. 16. The CPU of the operation controller 205 performs the insert setting process in FIG. 17 by reading out a program stored in the memory 207 and executing the program.

Steps S401 to S405, and S418 are the same as the steps S201 to S205, and S213 in FIG. 10. Further, steps S412 to S414 are the same as the steps S208 to S210. Therefore, the process in FIG. 17 differs from that in FIG. 10 in steps S406 to S411, and S415 to S417, and hence these steps will be described.

These different steps are associated with detection of whether an insertion operation has been performed on the insert setting preview display for double-sided printing, in each of respective cases where printing is performed on the front side, the reverse side, and both sides of a chapter sheet.

Referring to FIG. 17, the operation controller 205 determines whether or not there has been detected an insertion operation for the setting of insertion of a chapter sheet for front-side printing (step S406). If it is determined in the step S406 that there has not been detected an insertion operation for the setting of insertion of a chapter sheet for front-side printing (NO to the step S406), the operation controller 205 proceeds to a step S408.

On the other hand, if it is determined in the step S406 that there has been detected an insertion operation for the setting of insertion of a chapter sheet for front-side printing (YES to the step S406), the operation controller 205 switches the display on the touch screen display 200 to a preview display in which the chapter sheet has been inserted as illustrated in FIG. 14B. Further, the operation controller 205 stores the insertion position information of the chapter sheet to have an original image printed on the front side thereof in the memory 207 of the operation terminal 100 to thereby set the insertion position of the chapter sheet (step S407), and then proceeds to the step S412.

Referring back to the step S408, the operation controller 205 determines in this step whether or not there has been detected an insertion operation for the setting of insertion of a chapter sheet for back-side printing. If it is determined in the step S408 that there has not been detected an insertion operation for the setting of insertion of a chapter sheet for back-side printing (NO to the step S408), the operation controller 205 proceeds to a step S410.

On the other hand, if it is determined in the step S408 that there has been detected an insertion operation for the setting of insertion of a chapter sheet for back-side printing (YES to the step S408), the operation controller 205 updates the display on the touch screen display 200 to a preview display in which the chapter sheet has been inserted, as shown in FIG. 14D. Further, the operation controller 205 stores the insertion position information of the chapter sheet to have an original image printed on the reverse side thereof in the memory 207 of the operation terminal 100 to thereby set the insertion position of the chapter sheet (step S409), and then proceeds to the step S412.

Referring back to the step S410, the operation controller 205 determines in this step whether or not there has been detected an insertion operation for the setting of insertion of a chapter sheet for double-sided printing. If it is determined in the step S410 that there has not been detected an insertion operation for the setting of insertion of a chapter sheet for double-sided printing (NO to the step S410), the operation controller 205 proceeds to a step S415.

On the other hand, if it is determined in the step S410 that there has been detected an insertion operation for the setting of insertion of a chapter sheet for double-sided printing (YES to the step S410), the operation controller 205 updates the display on the touch screen display 200 to a preview display in which the chapter sheet has been inserted, as shown in FIG. 15B. Further, the operation controller 205 stores the insertion position information of the chapter sheet to have original images printed on both sides thereof in the memory 207 of the operation terminal 100 to thereby set the insertion position of the chapter sheet (step S411), and then proceeds to the step S412.

Referring back to the step S415, if it is determined in this step that an operation for removal of the insert has been detected (YES to the step S415), the operation controller 205 updates the display on the touch screen display 200 to a preview display in which the insert setting has been canceled (step S416). Then, the operation controller 205 deletes information on the insert setting of the insert which has been canceled from the memory 207 of the operation terminal 100 to thereby cancel the insert setting (step S417), and then proceeds to a step 418.

According to the above-described insert setting process for double-sided printing, the user can perform an intuitive operation for setting an insert also when double-sided printing is set.

Next, a description will be given of a third embodiment of the present invention. The third embodiment has the same hardware configuration as the first embodiment, and has the same software configuration as the first embodiment except a point described in detail hereinafter, and hence components corresponding to those of the first embodiment are denoted by the same reference numerals, and description thereof is omitted. In the first and second embodiments, whether an insert is an interleaf sheet or a chapter sheet is determined according to an insertion position of the insert with respect to original pages in the insert preview image. In the third embodiment, it is possible to employ an insert setting method adapted to a case where a type of an insert is set in advance.

Figure 18A:
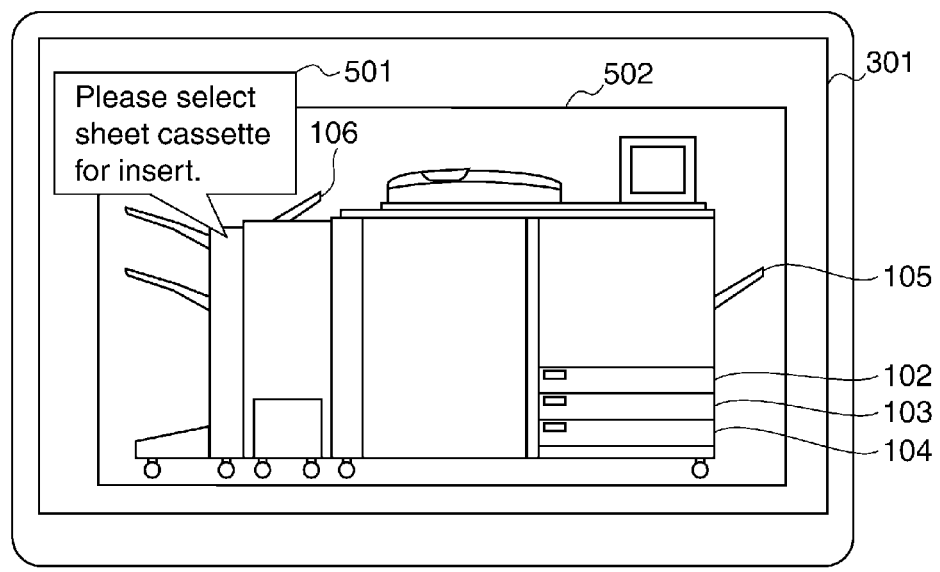
FIGS. 18A to 18C are views of sheet selection screens for an insert displayed on an information processing apparatus (operation terminal) according to a third embodiment of the present invention.
Figure 18B:
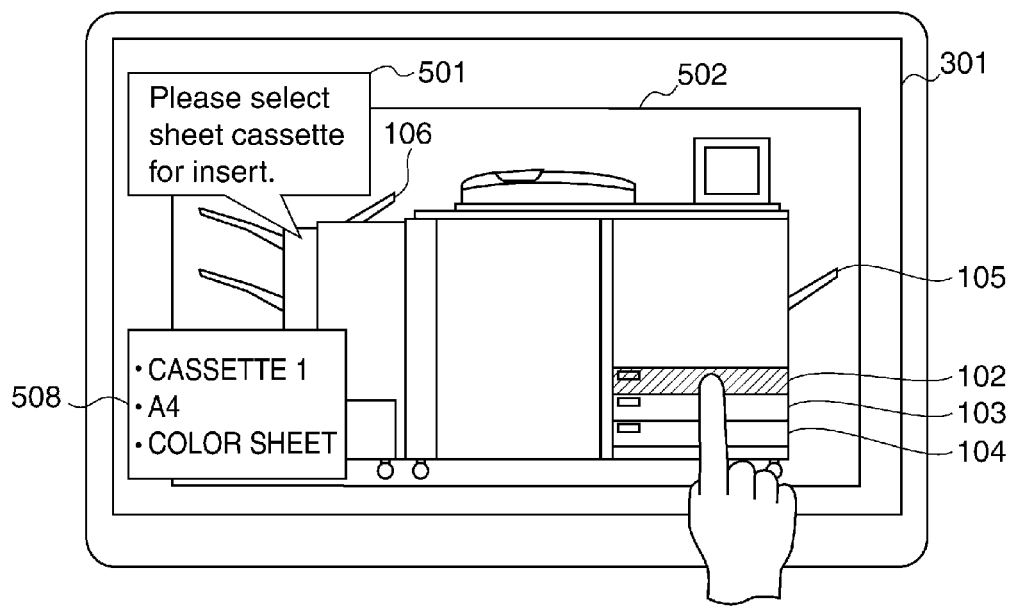
Figure 18C:
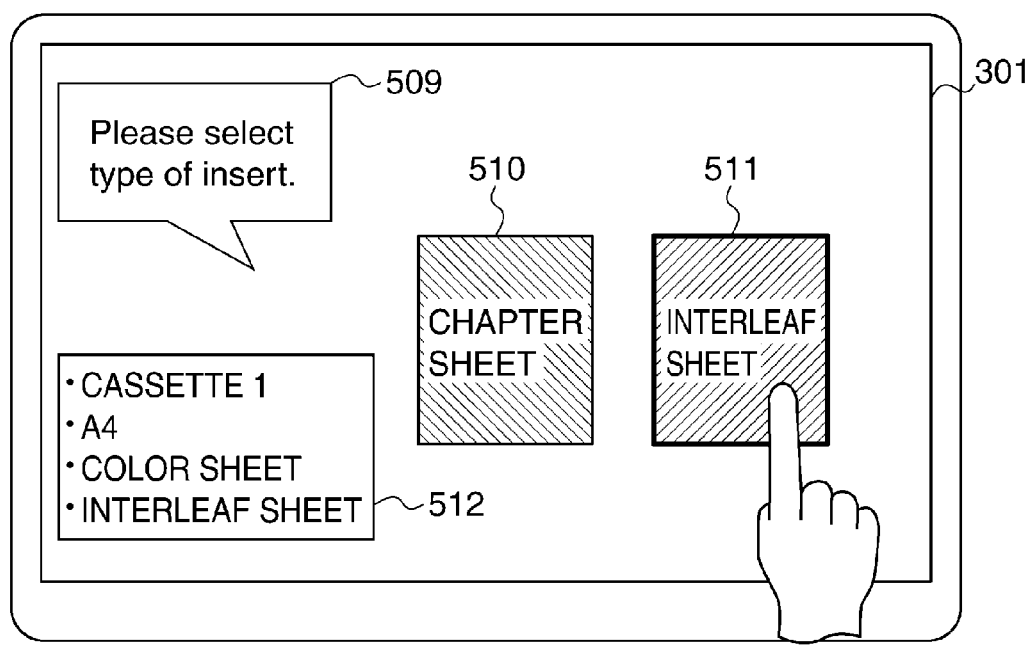

FIGS. 18A to 18C are views of sheet selection screens for an insert.

Referring to FIGS. 18A to 18C, first, to set the sheet type of an insert, a sheet selection-prompting message 501 and an apparatus image 502 of the image forming apparatus 90 are displayed as shown in FIG. 18A. On this display, the user touches one of the sheet cassettes 102 to 104, the manual feed tray 105, and the inserter 106 of the apparatus image 502, whereby a sheet feeder for the insert is selected.

FIG. 18B shows an example in which the user has selected the sheet cassette 102. At this time, sheet registration information 508 of the selected sheet cassette 102 is displayed.

When the user performs a selection finalizing operation on the screen shown in FIG. 18B, next, as shown in FIG. 18C, there are displayed a message 509 prompting selection of a type of the insert, a preview image 510 of the chapter sheet, and a preview image 511 of the interleaf sheet. On this display, the user touches one of the preview image 510 of the chapter sheet and the preview image 511 of the interleaf sheet, as shown in FIG. 18C, to thereby select the type of the insert.

FIG. 18C shows an example in which the interleaf sheet has been selected. At this time, sheet setting information 512 is displayed, and the sheet setting information of the insert is stored in the memory 207 of the operation terminal 100. As described above, in the present embodiment, before displaying an insert image, the sheet feeder images indicative of the plurality of sheet feeder units provided in the image forming apparatus 90 are displayed on the display section, and the user is prompted to select a sheet feeder unit for feeding the insert from the sheet feeder images displayed on the display section.

FIGS. 19A to 19D are views useful in explaining a method of setting an insert from the sheet cassettes of an apparatus image 513.

FIG. 19A shows a preview display for the insert setting displayed on the touch screen display 200. The preview display for the insert setting in FIG. 19A displays the sheet setting information 512 of the insert set in advance and the apparatus image 513.

On the apparatus image 513, the sheet cassette 102 and the manual feed tray 105 are displayed in respective colors according to the sheet cassette information (the sheet cassette 1 containing interleaf sheets and the manual feed tray containing chapter sheets) described in the sheet setting information 512. The insert preview image displayed here shows the above-mentioned sheet feeder images indicative of the plurality of sheet feeder units provided in the image forming apparatus 90.

Further, as shown in FIG. 19B, the preview display can be moved by the scroll operation.

Figure 19C:
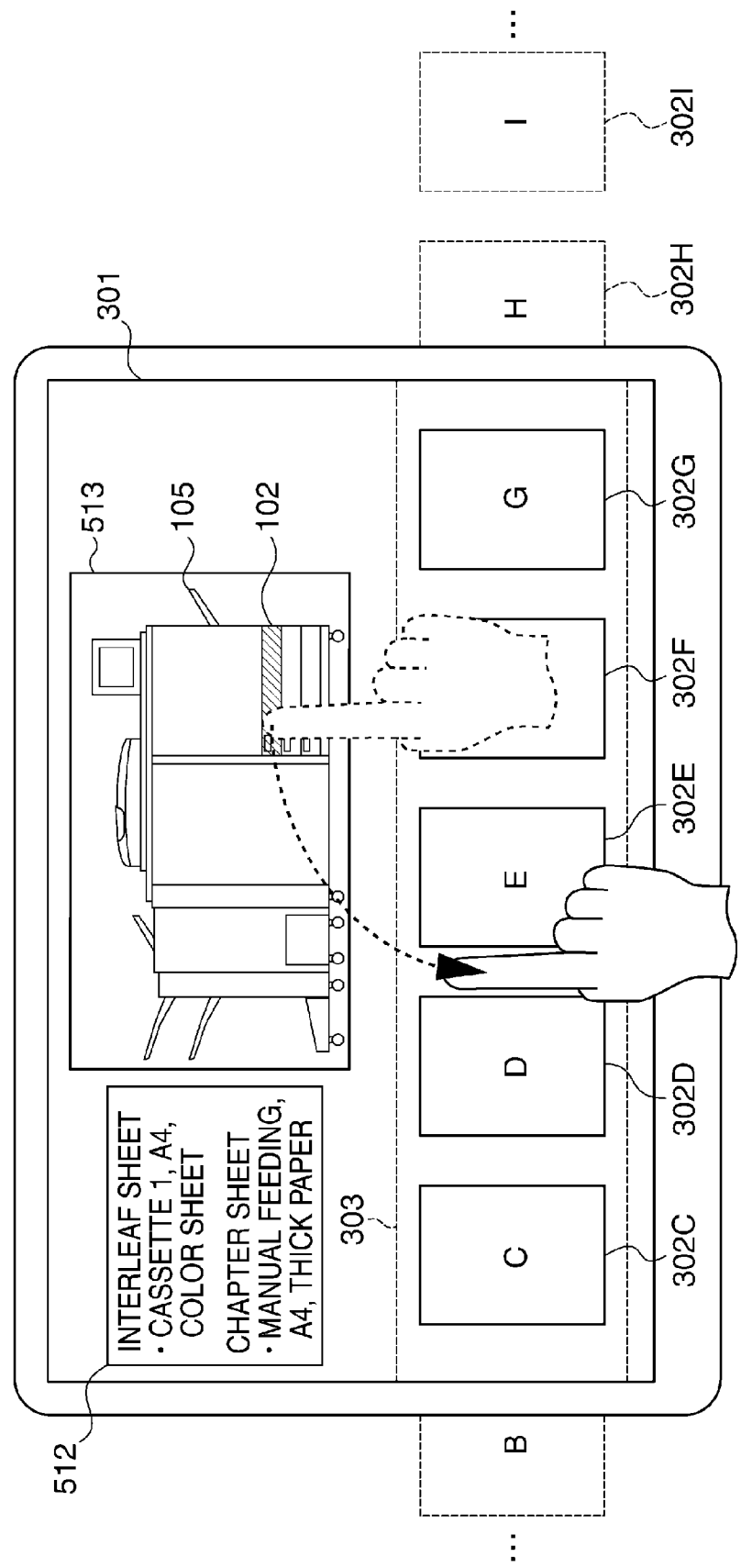

To set the insertion of an interleaf sheet on this preview display, as shown in FIG. 19C, the user performs a drag operation for moving the touching finger from a position of the sheet cassette 102 of the apparatus image 513, registered as the sheet cassette of the interleaf sheet, to a position between the preview images 302D and 302E indicative of the front pages in the object display area 303, and removes the finger from the touch screen display 200 at the position.

By doing this, as shown in FIG. 19D, a preview image 516 of the interleaf sheet is displayed between the preview images 302D and 302E.

Figure 20:
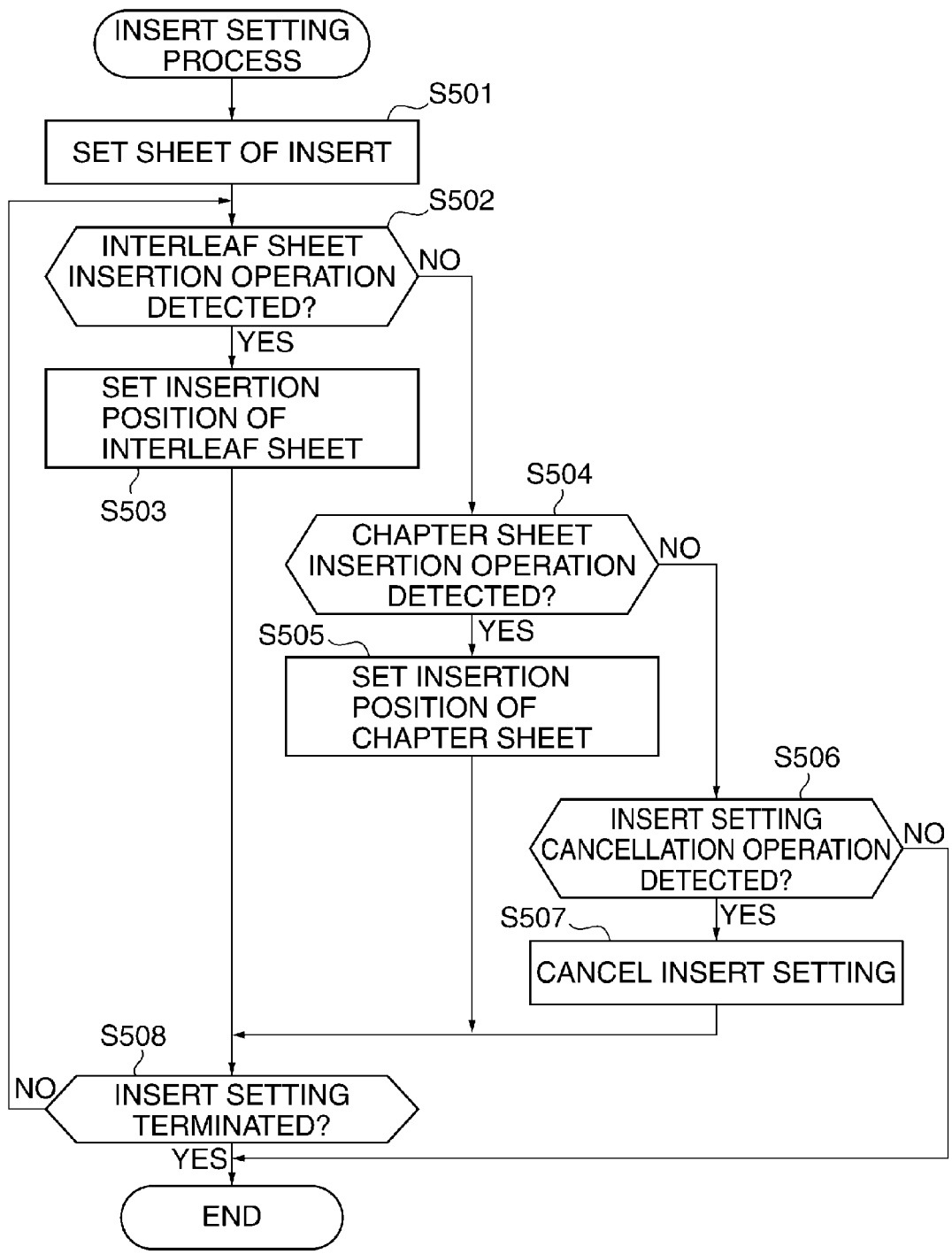
FIG. 20 is a flowchart of an insert setting process executed by the operation controller appearing in FIG. 2.

FIG. 20 is a flowchart of an insert setting process executed by the operation controller 205 appearing in FIG. 2. The CPU of the operation controller 205 performs the insert setting process in FIG. 20 by reading out a program stored in the memory 207 and executing the program.

Referring to FIG. 20, a sheet cassette for an insert is set according to the screen display described hereinabove with reference to FIGS. 18A to 18C (step S501). The third embodiment differs from the first and second embodiments in that the sheet setting for the insert is executed earlier than the insert setting.

Next, the operation controller 205 determines whether or not the interleaf sheet insertion operation described hereinabove with reference to FIGS. 19A to 19D has been detected to be executed on the preview display for the insert setting (step S502).

In the first and second embodiments, the type of the insert is detected based on a position of an insertion destination where the insert is inserted to the plurality of pages of preview images. In contrast, in the present embodiment, the insertion operation is started from the position of the sheet cassette 102 in which the interleaf sheet is registered as shown in FIG. 19C. That is, the type of the insert is detected based on a position of an insertion source from which the insert is fed and inserted.

If it is determined in the step S502 that the interleaf sheet insertion operation has been detected (YES to the step S502), the operation controller 205 updates the display on the touch screen display 200 to a preview display in which the interleaf sheet has been inserted as shown in FIG. 19D. Then, the operation controller 205 stores the insertion position information of the interleaf sheet in the memory 207 of the operation terminal 100 to thereby set the insertion position of the interleaf sheet (step S503).

Subsequent steps S504 and S505 correspond to the steps S206 and S207 (note that the steps S208 to S210 correspond to the step S501) in FIG. 10, and steps S506 and S507 correspond to the steps S211 and S212. Further, a step S508 corresponds to the step S213.

As described above, it is also possible to achieve the intuitive insertion operation using the method of inserting an insert preview image to which the sheet information has been set in advance.

Next, a description will be given of a fourth embodiment of the present invention. The fourth embodiment has the same hardware configuration as the first embodiment and the same software configuration as the first embodiment except a point described in detail hereinafter. Therefore, components corresponding to those of the first embodiment are denoted by the same reference numerals, and description thereof is omitted.

In the first to third embodiments, the user sets a sheet for an insert according to the screen display on the operation terminal 100. The fourth embodiment is configured such that it is possible to employ a method which makes simpler the user's operation required to set an insert, and enables more intuitive determination of the sheet type of the insert.

FIGS. 21A to 21D are views useful in explaining a method of setting an insert from sheets set in sheet cassettes images of which appear in the apparatus image 513.

Figure 21A:
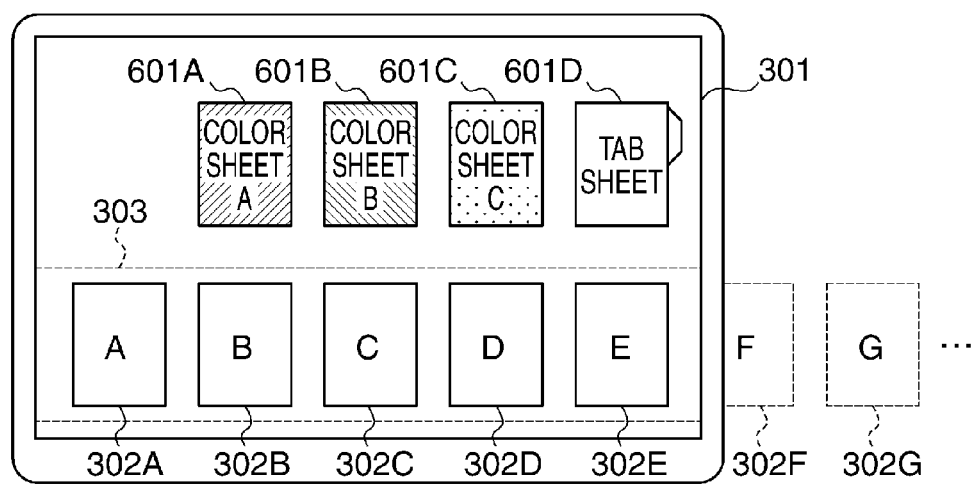
FIGS. 21A to 21D are views useful in explaining a method of setting an insert from sheets set in the sheet cassettes of the apparatus image, by an information processing apparatus (operation terminal) according to a fourth embodiment of the present invention.

FIG. 21A shows a preview display for the insert setting in the present embodiment. Differently from the first to third embodiments, in the present embodiment, insert preview images 601A to 601D are displayed above the object display area 303 by referring to the sheet registration information 602 described with reference to FIG. 11. The insert preview images displayed on this screen are images (insert preview images 601A to 601D) based on information on recording sheets set in the sheet feeder units, acquired from the image forming apparatus 90.

Figure 21B:
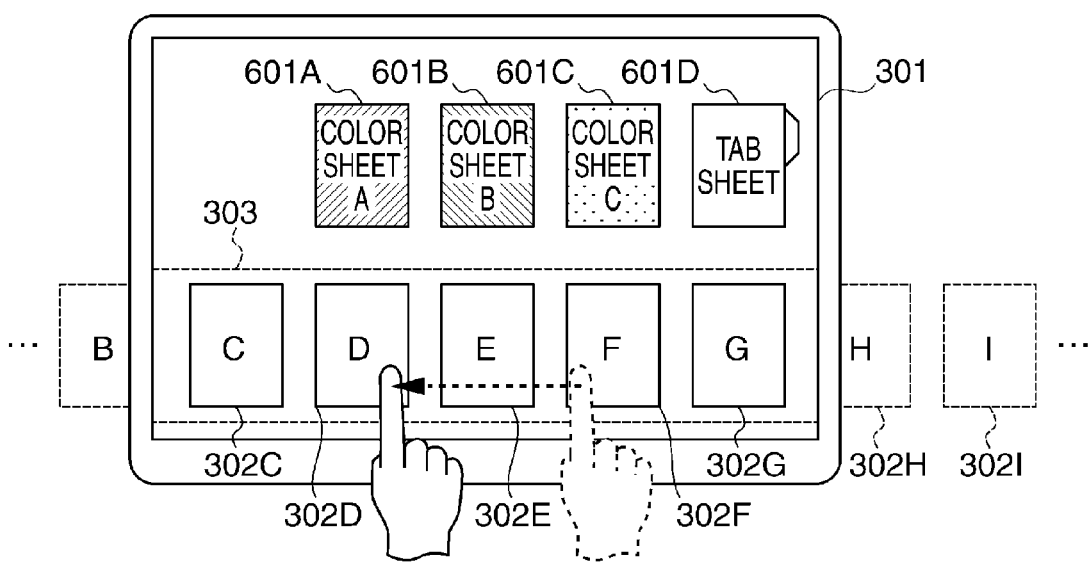

Further, as shown in FIG. 21B, similar to the first to third embodiment, the preview display can be moved by the scroll operation.

Figure 21C:
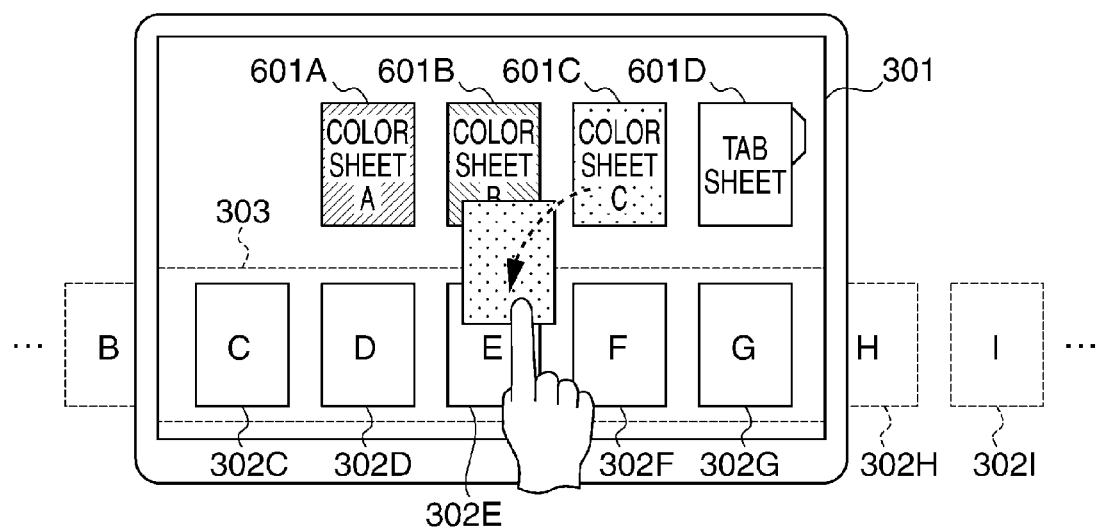

To insert a chapter sheet of color sheet C, the user drags the insert preview image 601C of color sheet C to a position of the preview image 302E in the object display area 303 such that the insert preview image 601C is superimposed on the preview image 302E as shown in FIG. 21C, and drops the insert preview image 601C at the position by removing the finger from the touch screen display 200. By doing this, an insertion position of the chapter sheet is finalized.

Figure 21D:
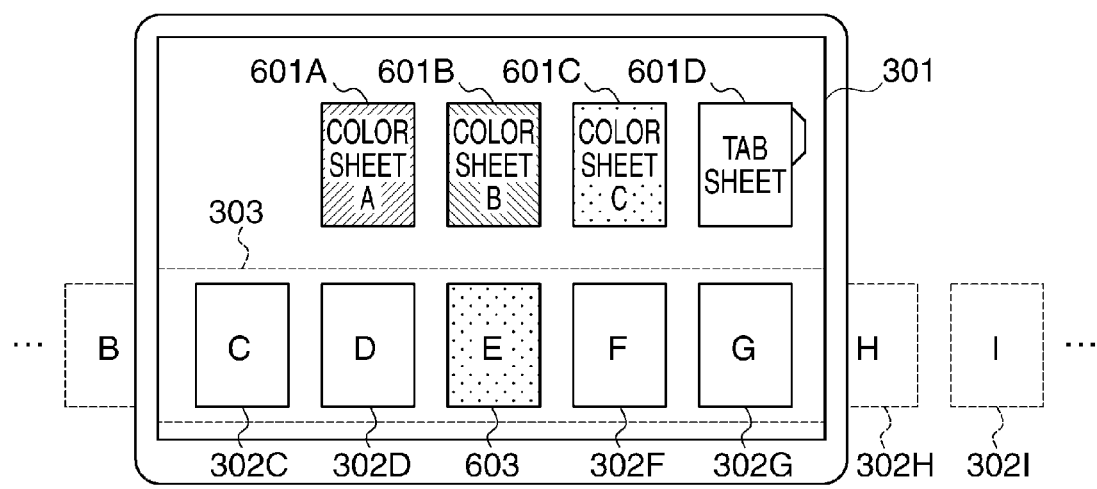

Then, as shown in FIG. 21D, a preview image 603 of the chapter sheet is displayed at the position of the preview image 302E, whereby the setting of insertion of the chapter sheet is completed. Also in the case where an interleaf sheet is inserted, it is only required to select an insert preview image in the above-described manner, and then perform the same operation as described in the first embodiment.

Figure 22:
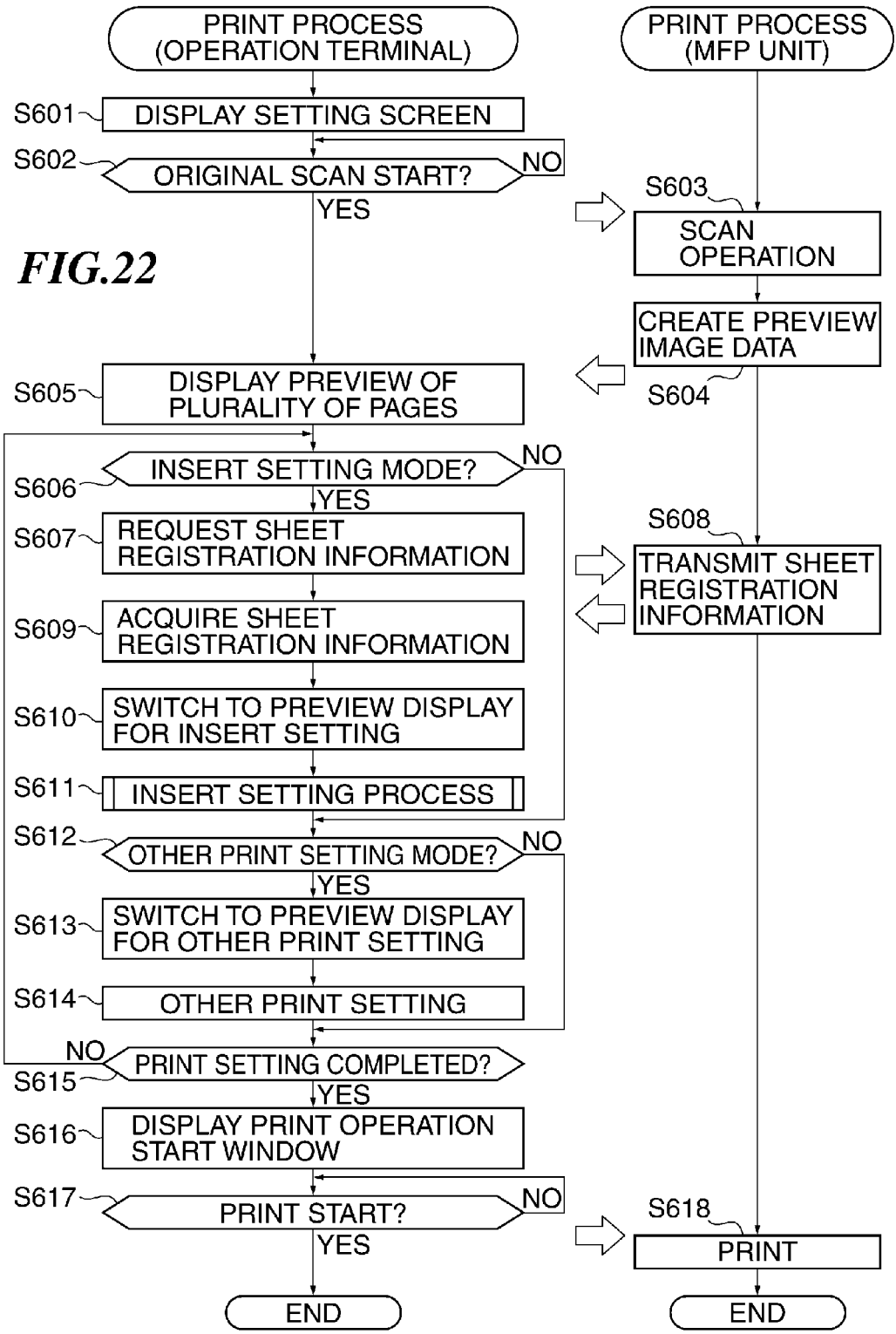
FIG. 22 is a flowchart of a print process executed by the operation controller and the CPU appearing in FIG. 2.

FIG. 22 is a flowchart of a print process executed by the operation controller 205 and the CPU 212, appearing in FIG. 2. The CPU of the operation controller 205 performs part of the print process by reading out a program stored in the memory 207 and executing the program. Further, the CPU 212 of the MFP unit 101 performs the other part of the print process by reading out a program stored in the ROM 213 into the memory 216 and executing the program.

Steps S601 to S605 in FIG. 22 are the same as the steps S101 to S105 in FIG. 9. Further, steps S612 to S618 are the same as the steps S109 to S115.

Therefore, the print process in FIG. 22 differs from that in FIG. 9 in steps S606 to S611, and hence these steps will be described.

Referring to FIG. 22, similar to the above-described print processes, the operation controller 205 determines whether or not the insert setting has been designated to be started on the touch screen display 200 (step S606). If it is determined in the step S606 that the insert setting has not been designated to be started (NO to the step S606), the operation controller 205 proceeds to a step S612.

On the other hand, if it is determined in the step S606 that the insert setting has been designated to be started (YES to the step S606), the operation controller 205 proceeds to a step S607. Then, the operation controller 205 transmits a sheet registration information request to the MFP unit 101 for requesting registration information of sheets which are candidates of the insert (step S607), and the operation terminal 100 enters a waiting state.

In a step S608, the CPU 212 of the MFP unit 101 receives the sheet registration information request from the operation terminal 100 via the wireless communication line 221. Then, the CPU 212 transmits the sheet registration information 602 stored in the memory 216 to the operation terminal 100 via the wireless communication line 221 (step S608). The step S608 corresponds to an operation of a reception unit configured to receive from the operation terminal 100 a sheet registration information request which requests information on recording sheets set in the sheet feeder units, and an operation of a transmission unit configured to transmit the information on the recording sheets set in the sheet feeder units.

The operation controller 205 of the operation terminal 100 acquires the sheet registration information 602 sent from the MFP unit 101 (step S609), and stores the acquired sheet registration information 602 in the memory 207 of the operation terminal 100.

Next, the operation controller 205 displays the preview for the insert setting including the insert preview images 601 indicative of the registered sheets, respectively, as shown in FIG. 21A on the touch screen display 200 (step S610).

Then, the operation controller 205 executes an insert setting process for setting an insert based on an operation performed on the preview images for the insert setting shown in FIGS. 21A to 21D (step S611). The insert setting process will be described hereafter.

Figure 23:
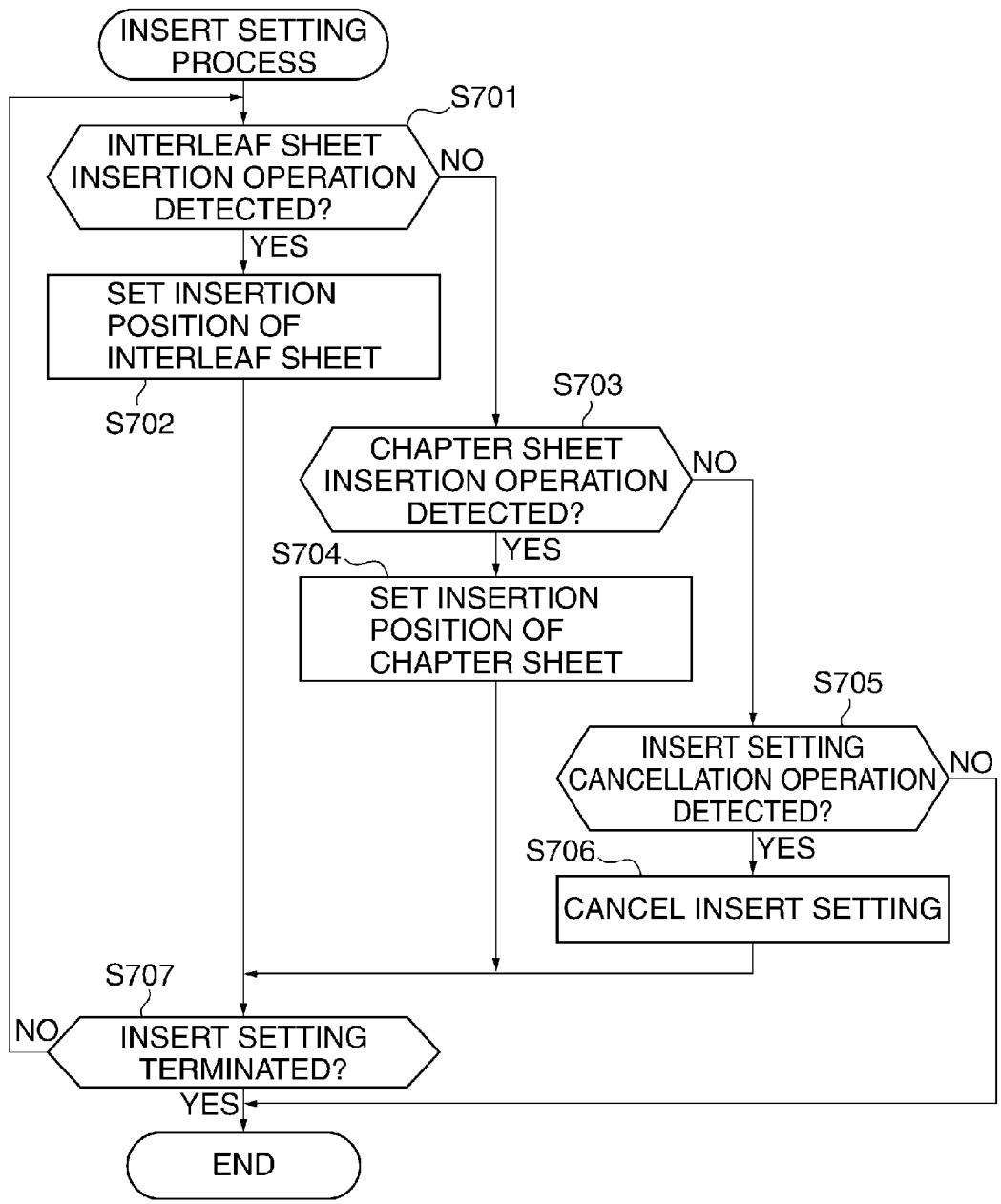
FIG. 23 is a flowchart of an insert setting process executed in a step in the print process in FIG. 22.

FIG. 23 is a flowchart of the insert setting process executed in the step S611 in the print process in FIG. 22. The CPU of the operation controller 205 of the operation terminal 100 performs the insert setting process in FIG. 23 by reading out a program stored in the memory 207 and executing the program.

The operation controller 205 determines whether or not the interleaf sheet insertion operation described hereinabove with reference to FIGS. 21A to 21D is detected to be executed on the preview display for the insert setting (step S701).

In the first to third embodiments, the type and insertion position of the insert are detected in this process. In contrast, in the present embodiment, detection of the sheet type of the insert based on the insertion source of the insert preview image and detection of the type of the insert based on an insertion position of the insert to the preview images of the original are achieved only based on the user's drag operation as shown in FIG. 21D.

If it is determined in the step S701 that an insertion operation for an interleaf sheet has not been detected (NO to the step S701), the operation controller 205 proceeds to a step S703.

On the other hand, if it is determined in the step S701 that an insertion operation for an interleaf sheet has been detected (YES to the step S701), the operation controller 205 updates the display on the touch screen display 200 to a preview display in which the interleaf sheet has been inserted as shown in FIG. 21D. Then, the operation controller 205 stores the insertion position information of the interleaf sheet and the sheet type of the insert in the memory 207 of the operation terminal 100 to thereby set the insertion position of the interleaf sheet (step S702), and then proceeds to a step S707.

The step S703 and a step S704 subsequent thereto correspond to the steps S206 and S207 (the steps S208 to S210 are unnecessary) in FIG. 10, and steps S705 and S706 correspond to the steps S211 and S212. Further, the step S707 corresponds to the step S213.

As described above, in the present embodiment, the user selects a candidate of a sheet type of an insert, and performs the operation for inserting the selected insert in the preview of the original pages on the preview display, whereby the user can more intuitively execute determination of the sheet type and the insertion position of the insert.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-266227, filed Dec. 5, 2012, which is hereby incorporated by reference herein in its entirety.

What is claimed is:

1. A print setting apparatus having an operation unit with touch panel function, comprising:
a display unit configured to cause the operation unit to display a plurality of images and an object indicating an additional sheet; and
a control unit configured to configure a first setting, in a case where the object is dragged to a position between a first image and a second image, such that the additional sheet is inserted between a first sheet on which the first image is printed and a second sheet on which the second image is printed, to configure a second setting, in a case where the object is dragged to a position on one of the first image and the second image, such that the one of the first image and the second image is printed on the additional sheet, and to cancel the first setting or the second setting, in a case where the object is dragged from the position between the first image and the second image or from the position on one of the first image and the second image,
wherein the control unit is further configured to configure a setting, in a case where the object is dragged to the position between the first image and the second image, such that two additional sheets are displayed on the operation unit between a first sheet on which the first image is printed and a second sheet on which the second image is printed when the plurality of images are to be printed using double sided printing.

2. A print setting apparatus according to claim 1, wherein the display unit is configured to cause the operation unit to display the object between the first image and the second image, in a case where the object is dragged to a position between the first image and the second image.

3. A print setting apparatus according to claim 1, further comprising a reading unit configured to read an image on an original,
wherein the plurality of images displayed on the operation unit are images read by the reading unit.

4. A print setting apparatus according to claim 1, further comprising a printing unit configured to print an image onto an original,
wherein displaying of the plurality of images on the operation unit is a preview of images to be printed by the printing unit.

5. A print setting apparatus according to claim 1, further comprising a selecting unit configured to select a feeding source from which the additional sheet is to be fed.

6. A control method for controlling a print setting apparatus having an operation unit with touch panel function, comprising:
causing the operation unit to display a plurality of images and an object indicating an additional sheet;
configuring a first setting, in a case where the object is dragged to a position between a first image and a second image, such that the additional sheet is inserted between a first sheet on which the first image is printed and a second sheet on which the second image is printed;
configuring a second setting, in a case where the object is dragged to a position on one of the first image and the second image, such that the one of the first image and the second image is printed on the additional sheet;
cancelling the first setting or the second setting, in a case where the object is dragged from the position between the first image and the second image or from the position on one of the first image and the second image; and
configuring a setting, in a case where the object is dragged to the position between the first image and the second image, such that two additional sheets are displayed on the operation unit between a first sheet on which the first image is printed and a second sheet on which the second image is printed when the plurality of images are to be printed using double sided printing.

7. A non-transitory computer-readable storage medium storing a program that causes a computer to perform a method for controlling a print setting apparatus having an operation unit with touch panel function, the method comprising:
causing the operation unit to display a plurality of images and an object indicating an additional sheet;
configuring a first setting, in a case where the object is dragged to a position between a first image and a second image, such that the additional sheet is inserted between a first sheet on which the first image is printed and a second sheet on which the second image is printed;
configuring a second setting, in a case where the object is dragged to a position on one of the first image and the second image, such that the one of the first image and the second image is printed on the additional sheet;
cancelling the first setting or the second setting, in a case where the object is dragged from the position between the first image and the second image or from the position on one of the first image and the second image; and
configuring a setting, in a case where the object is dragged to the position between the first image and the second image, such that two additional sheets are displayed on the operation unit between a first sheet on which the first image is printed and a second sheet on which the second image is printed when the plurality of images are to be printed using double sided printing.

8. A print setting apparatus having an operation unit with touch panel function, comprising:
a display unit configured to cause the operation unit to display a plurality of images and an object indicating an additional sheet; and
a control unit configured to configure a first setting, in a case where the object is dragged to a position between a first image and a second image, such that the additional sheet is inserted between a first sheet on which the first image is printed and a second sheet on which the second image is printed, to configure a second setting, in a case where the object is dragged to a position on one of the first image and the second image, such that the one of the first image and the second image is printed on the additional sheet, and to cancel the first setting or the second setting, in a case where the object is dragged from the position between the first image and the second image or from the position on one of the first image and the second image, wherein the control unit is further configured to configure a setting, in a case where the object is dragged to the position on one of the first image and the second image, such that two additional sheets are displayed on the operation unit with the one of the first image and the second image being displayed on one of the two additional sheets when the plurality of images are to be printed using double sided printing.

9. A print setting apparatus having an operation unit with touch panel function, comprising:
 a display unit configured to cause the operation unit to display a plurality of images and an object indicating an additional sheet; and
 a control unit configured to configure a first setting, in a case where the object is dragged to a position between a first image and a second image, such that the additional sheet is inserted between a first sheet on which the first image is printed and a second sheet on which the second image is printed, to configure a second setting, in a case where the object is dragged to a position on one of the first image and the second image, such that the one of the first image and the second image is printed on the additional sheet, and to cancel the first setting or the second setting, in a case where the object is dragged from the position between the first image and the second image or from the position on one of the first image and the second image, wherein the control unit is further configured to configure a setting, in a case where the object is dragged to the position between the first image and the second image, such that two additional sheets are displayed on the operation unit, with the first image being displayed on one of the two additional sheets and the second image being displayed on the other one of the two additional sheets when the plurality of images are to be printed using double sided printing.

10. The print setting apparatus according to claim 1, wherein the control unit cancels the first setting or the second setting, in a case where the object is dragged from the position on one of the first image and the second image out of a predetermined area.

\* \* \* \* \*